(12) United States Patent
Maeda et al.

(10) Patent No.: US 8,938,811 B2
(45) Date of Patent: Jan. 20, 2015

(54) INFORMATION PROCESSING APPARATUS, METHOD, PROGRAM, AND INTEGRATED CIRCUIT

(75) Inventors: Manabu Maeda, Osaka (JP); Hideki Matsushima, Osaka (JP); Kenneth Alexander Nicolson, Hyogo (JP); Tomoyuki Haga, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 86 days.

(21) Appl. No.: 13/816,501

(22) PCT Filed: May 31, 2012

(86) PCT No.: PCT/JP2012/003579
§ 371 (c)(1),
(2), (4) Date: Feb. 12, 2013

(87) PCT Pub. No.: WO2012/172743
PCT Pub. Date: Dec. 20, 2012

(65) Prior Publication Data
US 2013/0185816 A1    Jul. 18, 2013

(30) Foreign Application Priority Data

Jun. 14, 2011   (JP) .................................. 2011-132691

(51) Int. Cl.
G06F 21/10 (2013.01)
G06F 21/60 (2013.01)

(52) U.S. Cl.
CPC .................................. *G06F 21/604* (2013.01)
USPC ........................................................ 726/30

(58) Field of Classification Search
USPC .......................................................... 726/30
See application file for complete search history.

(56) References Cited

U.S. PATENT DOCUMENTS 7,340,573 B2    3/2008   Watt
7,484,103 B2 *  1/2009   Woo et al. ..................... 713/189

(Continued)

FOREIGN PATENT DOCUMENTS

JP    2002-318698    10/2002
JP    2003-316585    11/2003

(Continued)

OTHER PUBLICATIONS

International Search Report issued Jul. 17, 2012 in International (PCT) Application No. PCT/JP2012/003579.

(Continued)

*Primary Examiner* — Amare F Tabor
(74) *Attorney, Agent, or Firm* — Wenderoth, Lind & Ponack, L.L.P.

(57) ABSTRACT

A content display apparatus which processes protected information configured, with an aim to prevent access from any unauthorized program, to include: a process managing unit which manages a plurality of processes operable in the content display apparatus; and an access detecting unit configured to detect access to the protected-information access detecting unit which detects access to the protected information. The process managing unit includes an application execution control unit which temporarily stops the operation of each of at least one process other than a process which accesses the protected information among the plurality of processes when the access to the protected information is detected by the protected-information access detecting unit.

10 Claims, 15 Drawing Sheets

(56) References Cited

U.S. PATENT DOCUMENTS

| | | | |
|---|---|---|---|
| 8,321,932 B2 * | 11/2012 | Bhargava et al. | 726/21 |
| 2002/0077985 A1 | 6/2002 | Kobata et al. | |
| 2002/0077986 A1 | 6/2002 | Kobata et al. | |
| 2002/0082997 A1 | 6/2002 | Kobata et al. | |
| 2004/0143714 A1 | 7/2004 | Watt | |
| 2004/0268332 A1 | 12/2004 | Mitsumori et al. | |
| 2010/0058441 A1 | 3/2010 | Isokawa et al. | |
| 2013/0305394 A1 * | 11/2013 | Nozue et al. | 726/30 |

FOREIGN PATENT DOCUMENTS

| | | |
|---|---|---|
| JP | 2004-517377 | 6/2004 |
| JP | 2004-288155 | 10/2004 |
| JP | 2004-326331 | 11/2004 |
| JP | 2005-190444 | 7/2005 |
| JP | 2005-216211 | 8/2005 |
| JP | 2006-163789 | 6/2006 |
| JP | 2009-259198 | 11/2009 |
| WO | 02/06931 | 1/2002 |

OTHER PUBLICATIONS

Daniel P. Bovet et al., "Understanding the Linux Kernel", O'Reilly Japan, Inc., Mar. 2002, with partial English translation.

"Android Developers (Android Open Source Project)", Apache License, Version 2.0, Jan. 2004, http://developer.android.com/intl/ja/guide/topics/security/security.html.

* cited by examiner

FIG. 7

| Protected-information identifier | Application identifier |
|---|---|
| http://192. 168. 1. 1/ | Application A |
| http://192. 168. 1. 2/ | Application B |
| ... | ... |

FIG. 8A (1522x) 1522

| 1000 | 1001 | 1002 | 1003 | 1004 | 1005 |
|---|---|---|---|---|---|
| Application A | Application B | Application C | Application C | Application D | Application E |

FIG. 8B (1522x) 1523

| 1000 |
|---|
| Application A |

FIG. 8C (1522x) 1524

| 1000 | 1004 |
|---|---|
| Application A | Application D |

1524a

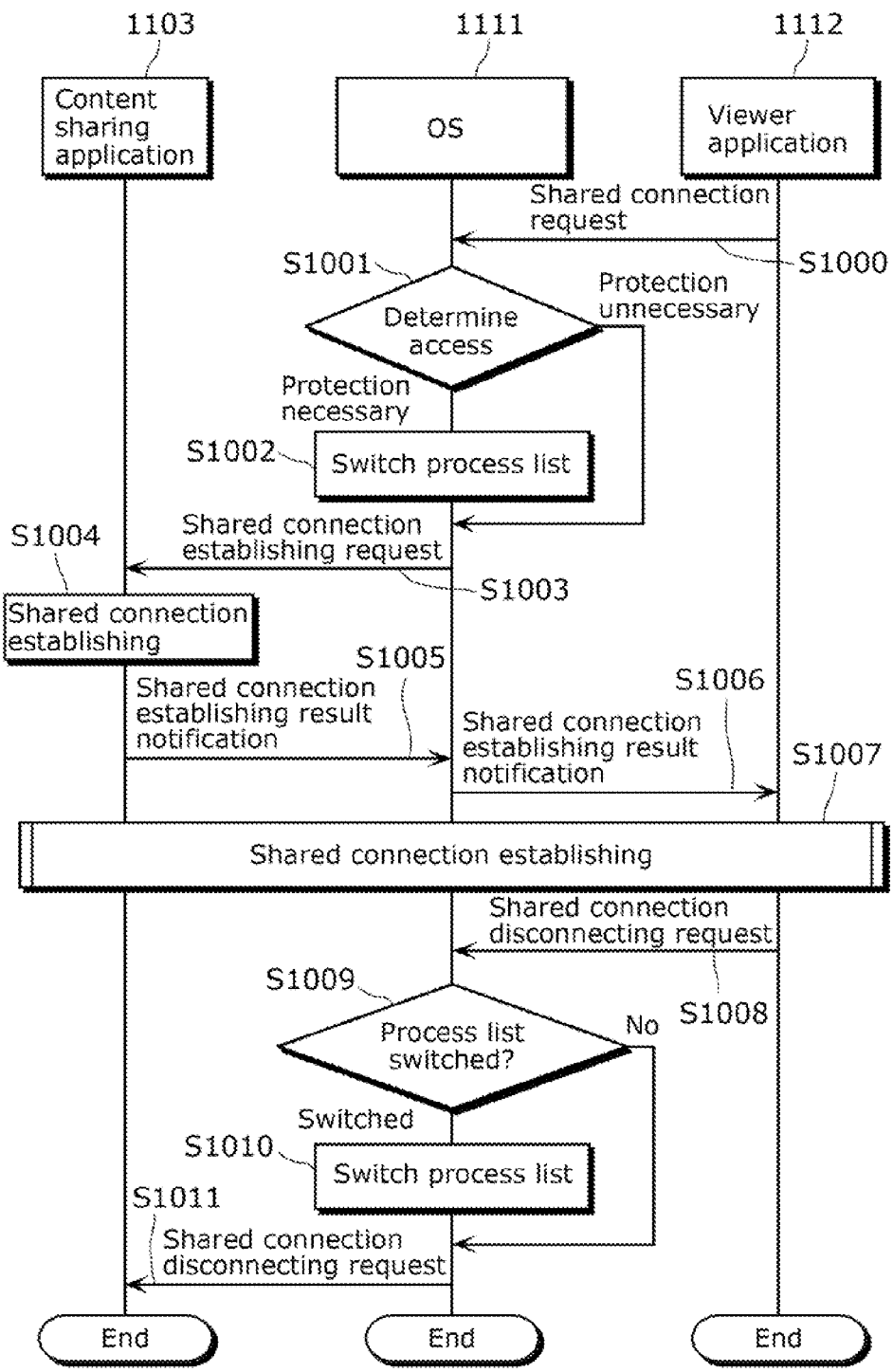

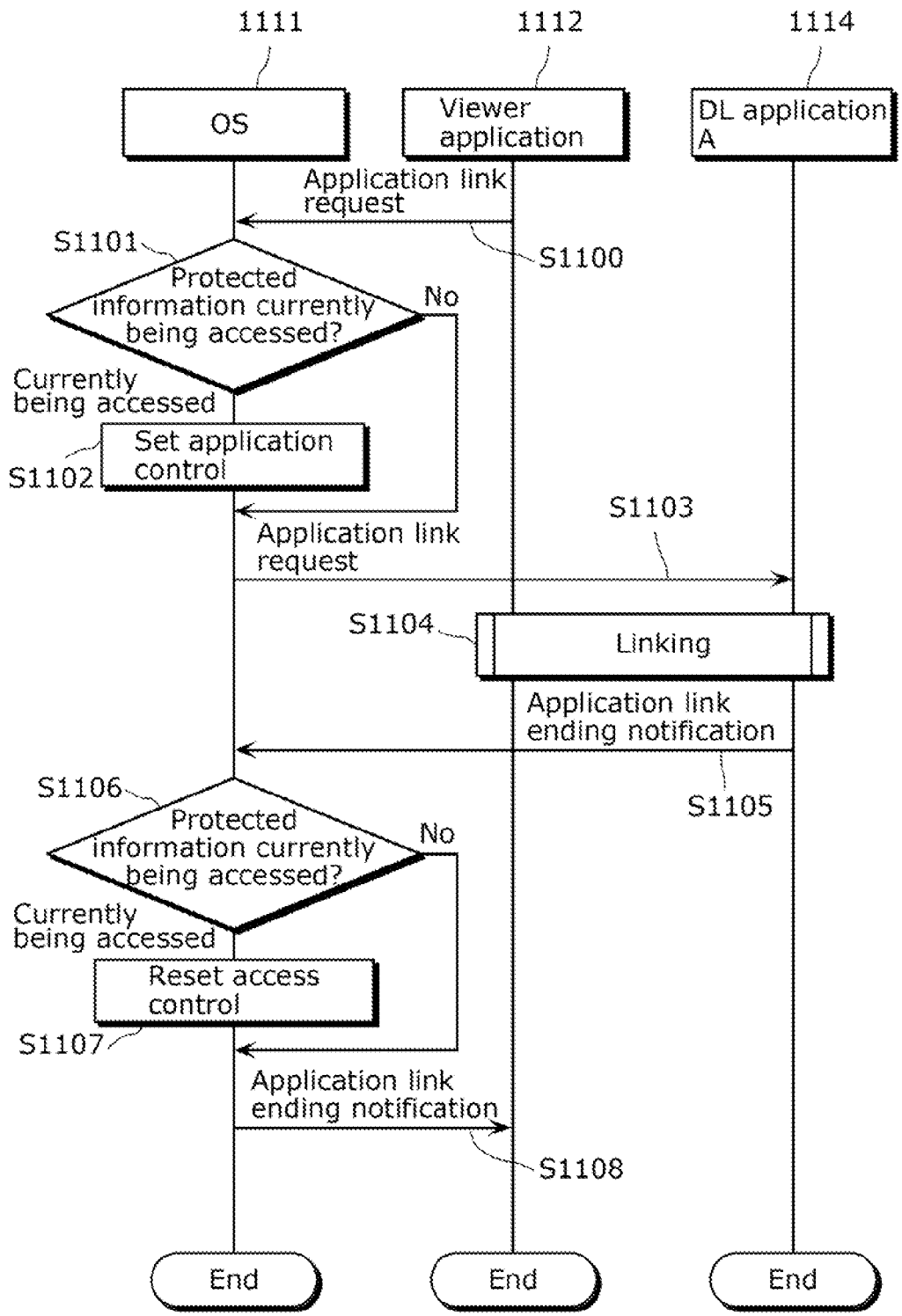

INFORMATION PROCESSING APPARATUS, METHOD, PROGRAM, AND INTEGRATED CIRCUIT

TECHNICAL FIELD

The present invention relates to an information processing apparatus that prevents unauthorized access to data.

BACKGROUND ART

Information processing apparatuses are conventionally known which handle protected information and include a process management unit for managing processes operating in the apparatus (see Non Patent Literatures 1 and 2). The term "LINUX" included in the title of Non-patent Literature 1, "Understanding the Linux Kernel", is a registered trademark.

CITATION LIST

Non Patent Literature

[NPL 1]
"Understanding the Linux Kernel", written by DANIEL P. BOVET, MARCO CESATI, (O'REILLY)
[NPL 2]
http://developer.android.com/intl/ja/guide/topics/security/security.html (Guidance from the Android Developers/ the Android Open Source Project)

SUMMARY OF INVENTION

Technical Problem

However, when a process accesses protected information, the protected information could be acquired by a process other than the process which accesses in an unauthorized manner.

An object of the present invention is to provide an information processing apparatus that is capable of preventing unauthorized acquisition of protected information.

Solution to Problem

With an aim to achieve the aforementioned object, an information processing apparatus according to an aspect of the present invention is configured as an information processing apparatus which processes protected information and includes: a process managing unit configured to manage a plurality of processes which operate in the information processing apparatus; an access detecting unit configured to detect access to the protected information, wherein the process managing unit includes an execution control unit configured to temporarily stop the operation of each of at least one process other than a process which accesses the protected information among the plurality of processes when the access to the protected information is detected by the access detecting unit.

It is to be noted that these general and specific aspects may be implemented using a system, a method, an integrated circuit, a computer program, or a computer-readable recording medium, or any combination of systems, methods, integrated circuits, computer programs, or computer-readable recording media.

Advantageous Effects of Invention

Unauthorized acquisition of protected information can be prevented.

BRIEF DESCRIPTION OF DRAWINGS

FIG. 7 shows a structure of a protected-information access authorization list in Embodiment 1 of the present invention.
FIG. 8A shows a structure of a process list in Embodiment 1 of the present invention.
FIG. 8B shows a structure of the process list in Embodiment 1 of the present invention.
FIG. 8C shows a structure of the process list in Embodiment 1 of the present invention.
FIG. 9 is a flowchart illustrating access to protected-information in Embodiment 1 of the present invention.
FIG. 10 is a flowchart illustrating application linking in Embodiment 1 of the present invention.

DESCRIPTION OF EMBODIMENTS

Figure 1:
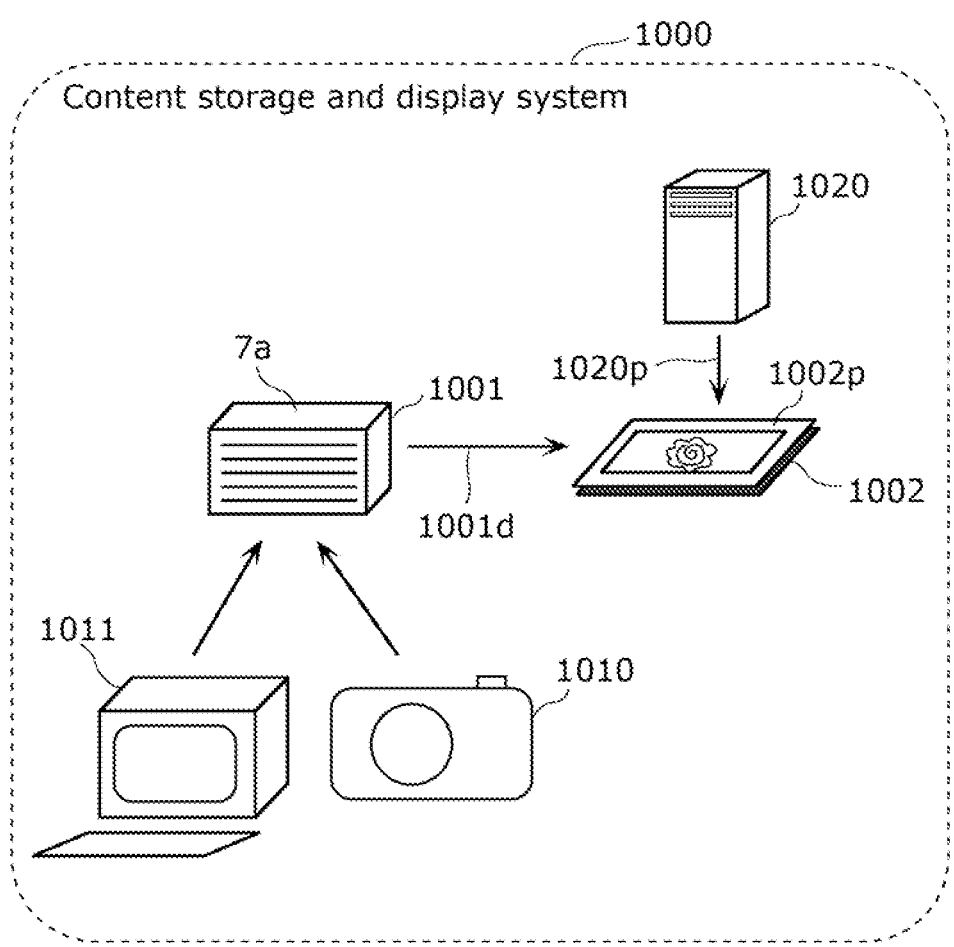
FIG. 1 shows an overall configuration of a content storage and display system in Embodiment 1 of the present invention.

Underlying Knowledge Forming Basis of the Present Invention

The inventors know that some types of mobile phones allow their users to download application software (hereinafter called "application") for the purpose of adding new functions to their purchased devices (i.e., their mobile phones) and to use the downloaded application.

In some cases, such applications do not allow access to various resources within the devices due to access control. Examples of such access that may be limited include access to positional information acquired by Global Positioning System (GPS), access to dialing functions, and access to a telephone directory or bookmarks.

In these years, however, there have emerged devices that have small access limitation and allow access to positional information, dialing functions, and data of a telephone directory so as to enable development of diverse applications.

For instance, the Android (a registered trademark) provided by Google Inc., supports applications downloaded from the Android Market, an application distribution site.

Such applications allow access to a telephone directory, bookmarks, GPS information, networking functions, etc.

In these circumstances, the problem of data leakage arises with personal information stored on mobile phones (names, addresses, telephone numbers, mail addresses, credit card numbers, etc.) and/or personal content (e.g., photographs, movies, e-mail, positional information).

With the Android, unauthorized applications may be downloaded from an open network such as the Internet.

An unauthorized downloaded application may allow a user to download the application by electronic mail or the like or cause the application to be downloaded by making use of the vulnerability of an application operating on the Android.

The unauthorized downloaded application reads out data such as personal information or content stored in a storage of the device. The data is then sent outside the device over a network against the user's intention, leading to the problem of data leakage.

One way to protect data stored in a storage device is to assign a different identifier (a user ID) to each user and control access to data stored in the storage device by other user (see Section 1.5.5 of Non-patent Literature 1, for instance).

In the Android, a different user ID is assigned to each one application downloaded from the Android Market, and a mechanism for user-to-user access control is thereby utilized for application-to-application access control (see Non-patent Literature 2 for details).

Consequently, in the Android, files of photographs or the like saved by an application A are inaccessible to an application B.

The Android further utilizes a configuration file called Manifest file. For an application to access a GPS or dialing functions, the functions for making the access need to be described in the Manifest file in advance. In other words, the application needs to acquire permission for the access from the user when being installed with such description.

In the Android, access to functions not described in the Manifest file is prohibited (see Non Patent Literature 2 for details).

However, Non-patent Literature 1 and 2 involve use of a privileged user ID that provides a privilege of accessing all data.

However, the conventional art has a problem that a privileged user ID may be acquired in an unauthorized manner making use of the vulnerability of the Android, and an unauthorized downloaded application may allow acquisition of the privileged user ID and enable access to files saved by other applications.

An object of the present technique is therefore to solve the existing problem by providing an information processing apparatus (see content display apparatus $1002$ shown in FIG. 1 etc.) that does not give rise the problem described below even if an unauthorized downloaded application (see application $1002w$ in FIG. 3) acquires a privileged user ID in an unauthorized manner. The problem is that the unauthorized downloaded application may allow access to protected information such as personal information and/or content that needs protection (see data $1001d$ in FIG. 1).

With an aim to achieve the aforementioned object, an information processing apparatus according to an aspect of the present invention is configured as an information processing apparatus (see a content display apparatus $1002$ etc. in FIG. 1 etc.) which processes protected information (see information $7a$) and includes: a process managing unit (see a process managing unit $1502$ in FIG. 6 etc.) configured to manage a plurality of processes which operate in the information processing apparatus; an access detecting unit (see a protected-information access detecting unit $501$) configured to detect access to the protected information, wherein the process managing unit includes an execution control unit (see an application execution control unit $1512$) configured to temporarily stop the operation of each of at least one process (at least one other process) other than a process (see a process $1002p$) which accesses the protected information among the plurality of processes when the access to the protected information is detected by the access detecting unit.

Figure 3:
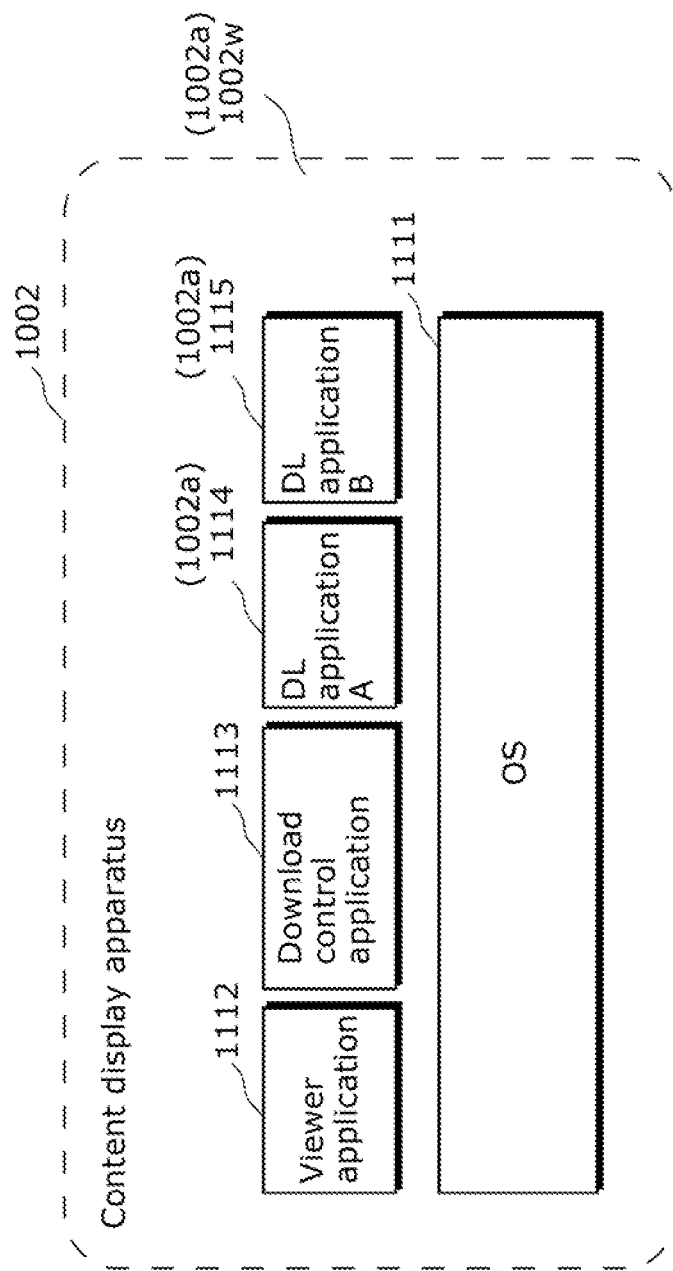
FIG. 3 shows a software configuration of a content display apparatus in Embodiment 1 of the present invention.

The information processing apparatus (see content display apparatus $1002$ of FIG. 1 etc.) is capable of preventing access to protected information (see data $1001d$ of FIG. 1) even if the user ID possessed by an unauthorized application (see unauthorized application $1002w$ in FIG. 3) is the privileged user ID that allow access to files of other applications (e.g., the viewer application $1112$ of FIG. 3).

Here, for example, the information processing apparatus may further include a process list managing unit configured to manage a process list which is a list of the plurality of processes managed by the process managing unit, and the execution control unit may be further configured to temporarily stop the operation of each of the at least one process other than the process which accesses the protected information by causing the process list managing unit to replace the managed process list with a process list which includes only the process which accesses the protected information when the access to the protected information is detected by the access detecting unit.

This only requires modification to the process list, making the configuration relatively simple.

Here, for example, the process which accesses the protected information may communicate with a process which is a communication destination originally for the at least one process other than the process which accesses the protected information while the operation of the at least one process is stopped, the information processing apparatus may further include a communication detecting unit configured to detect the communication, and notify the execution control unit of a process identifier for identifying the communication-destination process upon detecting the communication, and the execution control unit may be configured to cause the communication-destination process identified by the notified process identifier to stop operating only before the process identifier is notified, and cause the process to operate after the process identifier is notified.

In this way, the communication-destination process is activated when access to protected information is detected and communication with the process is performed, enabling more diverse kinds of processing that is performed when access to protected information is detected.

Here, for example, the information processing apparatus may further include an access control unit configured to limit access by a process to a resource, and the communication detecting unit may be configured to notify the access control unit of the process identifier for identifying the communication-destination process upon detecting the communication, so that the access control unit limits the access by the communication-destination process to the resource.

Limiting access to resources may be, for example, limiting access to communication resources to make communication unavailable. Alternatively, limiting access to resources may be limiting or disabling writing to resources such as a storage area. In addition, in such limitation of writing files, writing of files that do not have a predetermined flag may be prohibited and writing of only files with the flag may be permitted.

This can reduce undesirable effects caused by an operation of the communication-destination process.

Here, for example, the application execution control unit may be further configured to temporarily stop the operation of the at least one process by causing the process list managing unit to replace the managed process list with a process list which does not include any of the at least one process when the access to the protected information is detected by the access detecting unit.

This only requires modification to the process list, making the configuration relatively simple.

Here, for example, the information processing apparatus may further include a non-volatile storage device, and the execution control unit may be further configured, when the access to the protected information is detected, (i) to save a state of each of the at least one process to the non-volatile storage device and stop the operation of each of the processes when the detected access is started, and (ii) to control so that each of the processes returns to the state saved to the non-volatile storage device and re-start the operation of each of the at least one process when the detected access is ended.

This only requires saving and returning to the process state, making processing to be performed relatively simple.

Here, for example, the process managing unit may be configured to manage at least one first process and a second process which operates at a background, and the execution control unit may be configured to cause the at least one first process to stop as the at least one process when the access is detected, and may cause the second process to operate together with the which accesses process even when the access is detected.

The second process may be, for example, a process performed by an application for reproducing music data.

The process of the music reproducing application is thus not stopped; stoppage of a process that should not be stopped can be avoided.

Here, for example, the execution control unit may be configured to cause the information processing apparatus to perform a multiple-process operation when no access is detected and to perform a single-process operation when the access is detected.

In this way, when no access to protected information is detected, unauthorized acquisition of protected information is made difficult to perform by, for example, encrypting the protected information. Additionally, even when access to the information is detected, unauthorized acquisition of protected information is difficult due to a single-process operation. Thus, unauthorized acquisition is difficult when access is detected as well as when no access is detected, making unauthorized acquisition of protected information difficult more reliably.

In addition, a multi-process operation is done when no access is detected as described above. This makes it possible to maintain the ability to perform a multi-process operation.

Consequently, it is possible to concurrently achieve both the functionality to perform a multi-process operation and the functionality to reduce or prevent unauthorized acquisition of protected information.

In a single-process operation, only one process is executed. The one process is the process that performs the detected access as described above.

It is to be noted that these general and specific aspects may be implemented using a system, a method, an integrated circuit, a computer program, or a computer-readable recording medium, or any combination of systems, methods, integrated circuits, computer programs, or computer-readable recording media.

Embodiments of the present invention are described below with reference to the drawings.

An information processing apparatus (content display apparatus 1002) according to an embodiment is an apparatus in which the Android is implemented as an OS and represents an information processing apparatus (content display apparatus 1002 (FIGS. 1, 3, 4 and 6)) that processes protected information, which is information requiring protection (data 1001*d* in FIG. 1) against access from an unauthorized program (unauthorized application 1002*w* in FIG. 3). The information processing apparatus includes: a process managing unit 1502 (FIG. 6) that manages two or more processes operating in the information processing apparatus; a protected-information access detecting unit 1501 that detects access to protected information (data 1001*d*); and an application execution control unit 1512 that, when access to the protected information is detected by the protected-information access detecting unit 1501 ("Protection necessary" at S1001 in FIG. 9), temporarily stops (for the interval between S1002 and S1009 in FIG. 9) the operation of a process that is not authorized to access the protected information (such as the process of an application (e.g., unauthorized application 1002*w*) other than the application identified by the second data 1521*b* in FIG. 7 (i.e., application A)), and does not allow the process to be executed by a CPU 1201 during the interval.

Figure 6:
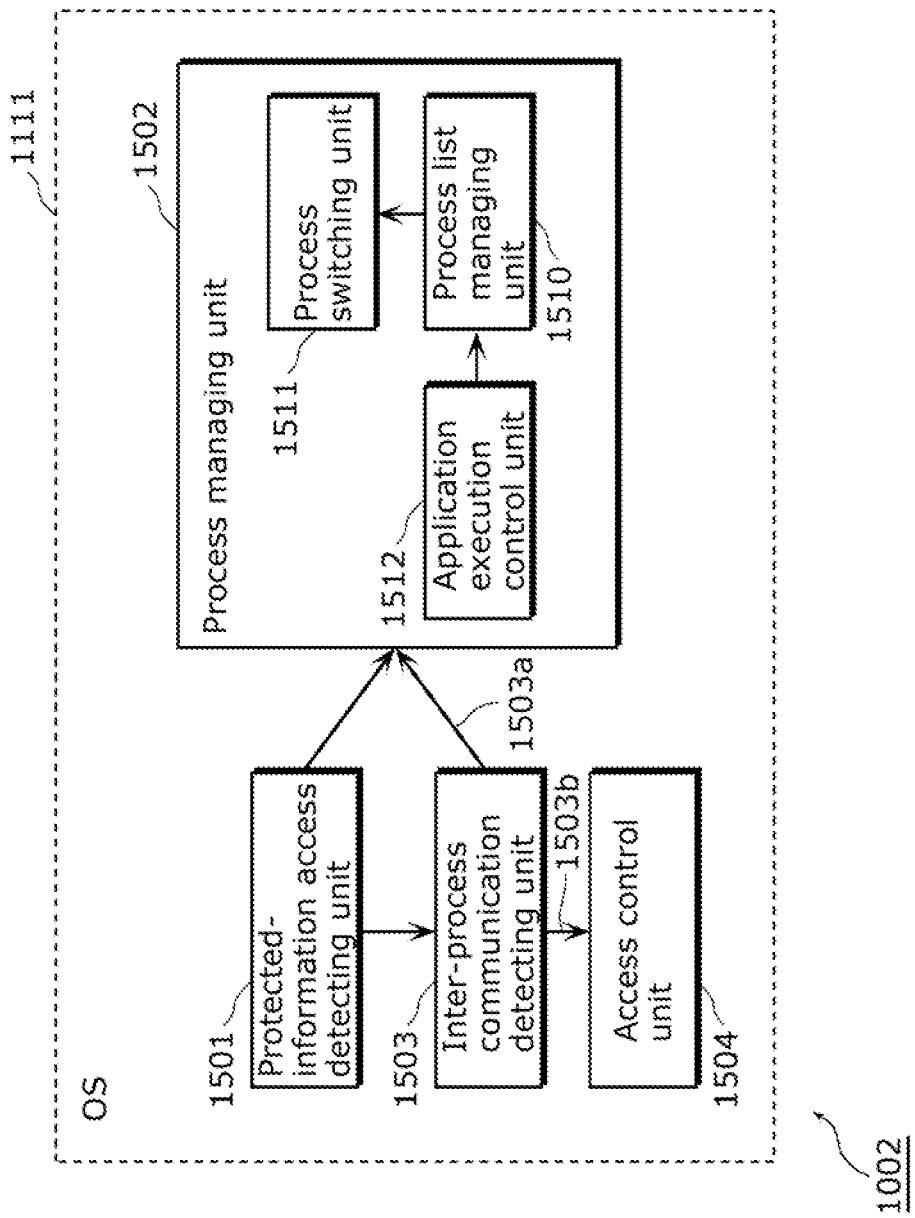
FIG. 6 shows an OS configuration of the content display apparatus in Embodiment 1 of the present invention.

The application execution control unit 1512 may be provided, for example, in the content display apparatus 1002 as part of the process managing unit 1502 as shown in FIG. 6, or provided outside the process managing unit 1502.

This makes it possible to address the possibility that an unauthorized downloaded application (e.g., the unauthorized application 1002*w* shown in FIG. 3) acquires a privileged user ID and access a file saved by another application (e.g., viewer application 1112 in FIG. 3).

Specifically, the information processing apparatus (see the content display apparatus 1002 in FIG. 1 etc.) stops an unauthorized application during the interval even if the user ID possessed by an unauthorized application (see the unauthorized application 1002*w* in FIG. 3) is a privileged user ID with which the application can access files saved by another application (e.g., the viewer application 1112 in FIG. 3). This can prevent unauthorized access to the protected information (see data 1001*d* in FIG. 1) by the unauthorized application.

Embodiment 1

The information processing apparatus according to Embodiment 1 of the present invention is a content display apparatus that acquires photograph data from a content storage apparatus storing photograph data and displays the data at the user's request. The content storage apparatus retrieves photograph data from devices such as cameras and PCs and stores the data.

[Configuration of Content Storage and Display System 1000]

FIG. 1 shows a configuration of a content storage and display system 1000 in Embodiment 1 of the present invention.

Figure 4:
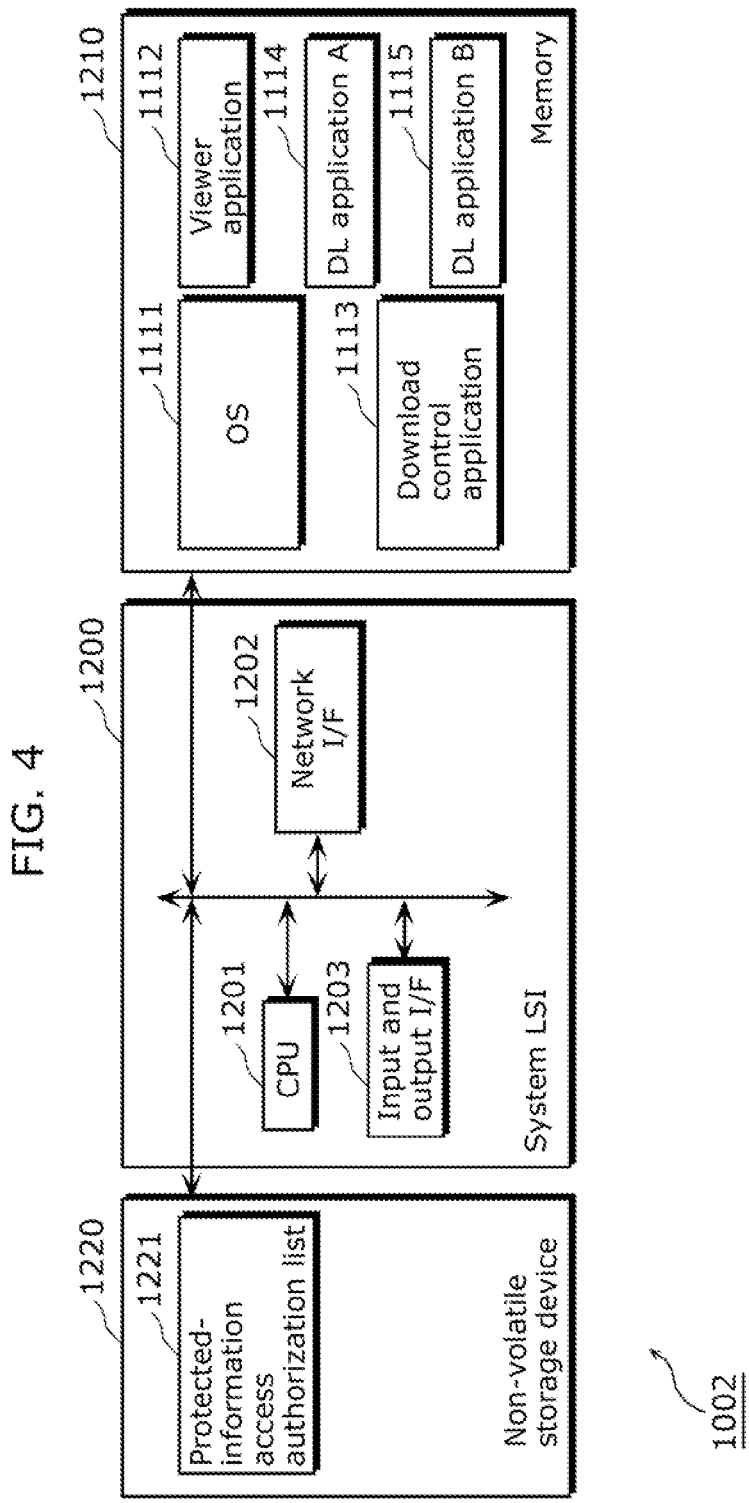
FIG. 4 shows a hardware configuration of the content display apparatus in Embodiment 1 of the present invention.
Figure 5:
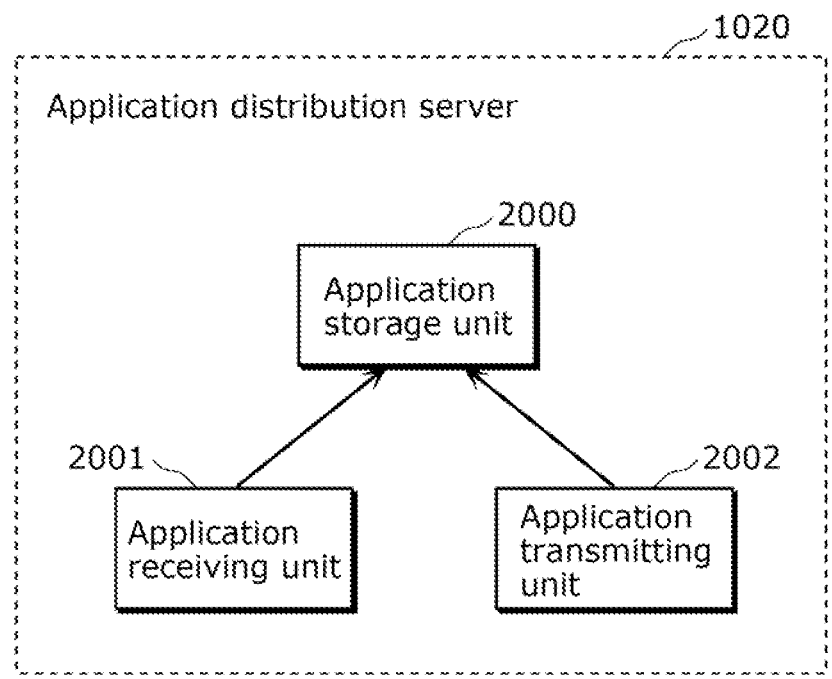
FIG. 5 shows the configuration of an application distribution server in Embodiment 1 of the present invention.

In FIG. 1, the content storage and display system 1000 includes a content storage apparatus 1001 (FIG. 2), a content display apparatus 1002 (FIGS. 3, 4, and 6), a camera 1010, a PC 1011, and an application distribution server 1020 (FIG. 5). The content display apparatus 1002 is also called an information processing apparatus hereinbelow.

The content storage apparatus 1001 retrieves photograph data from the camera 1010 and the PC 1011, and stores the data.

The content storage apparatus 1001 also includes a reading unit for reading data from a removable recording medium (not shown), and thus it can also read in data of photographs taken by someone other than the user.

The content storage apparatus 1001 also connects to the content display apparatus 1002 over a network and provides photograph data (data 1001d) read from the camera 1010 and/or the Personal Computer (PC) 1011 to the content display apparatus 1002.

The content display apparatus 1002 is connected with the content storage apparatus 1001 and/or the application distribution server 1020 over a network.

The content display apparatus 1002 acquires the photograph data (data 1001d) from the content storage apparatus 1001 at the user's request and displays the acquired photograph data.

The content display apparatus 1002 also downloads and executes an application (or a program 1020p of the application) from the application distribution server 1020 at the user's request.

The camera 1010 is connected to the content storage apparatus 1001 using Universal Serial Bus (USB), a wireless Local Area Network (LAN), or the like.

The camera 1010 records photograph data generated by the user taking pictures at occasions such as trips, onto non-volatile memory contained in the camera 1010 or a removable recording medium.

The camera 1010 then transfers the recorded photograph data to the content storage apparatus 1001 when it is connected with the content storage apparatus 1001.

It is also possible to remove the recording medium from the camera 1010, attach the recording medium to the content storage apparatus 1001, and transfer the photograph data stored in the recording medium from the camera 1010 to the content storage apparatus 1001.

The PC 1011 is a computer connected with a network and used by the user for receiving e-mail and/or for web browsing.

The PC 1011 is also connected with the content storage apparatus 1001 by a network.

Photograph data attached to mail or downloaded during web browsing is transferred to the content storage apparatus 1001 from the PC 1011 over the network.

The application distribution server 1020 is connected with the content display apparatus 1002 over a network.

The application distribution server 1020 is responsible for management of application (such as a program 1020p shown in FIG. 1) uploaded by developers (not shown) and downloading of such applications to the content display apparatus 1002.

[Software Configuration of Content Storage Apparatus 1001]

Figure 2:
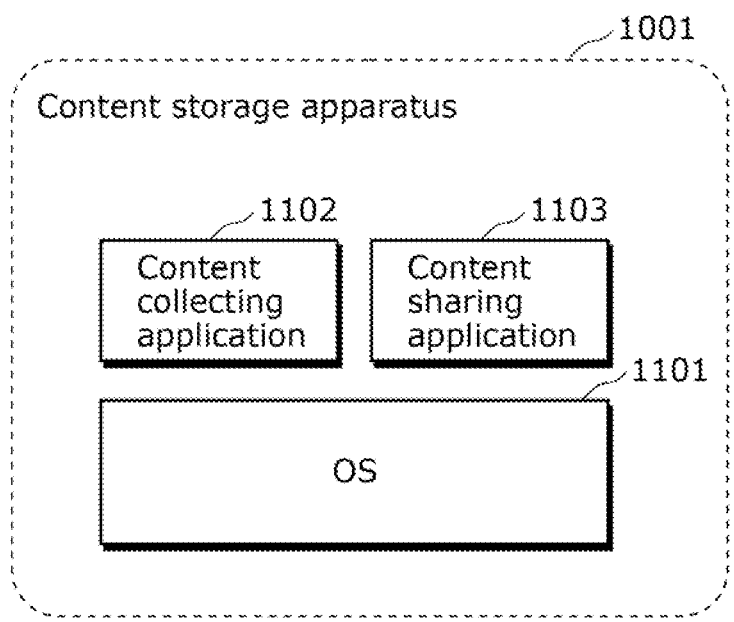
FIG. 2 shows a software configuration of a content storage apparatus in Embodiment 1 of the present invention.

FIG. 2 shows a software configuration of the content storage apparatus 1001 (FIG. 1) in Embodiment 1 of the present invention.

In FIG. 2, the content storage apparatus 1001 includes an Operating System (OS) 1101, a content collecting application 1102, and a content sharing application 1103.

The OS 1101 loads applications to operate on the OS 1101 (e.g., the content collecting application 1102 and the content sharing application 1103) onto memory and executes them.

When an application operating on the OS 1101 requests for a resource managed by the OS 1101, the OS 1101 checks whether the requesting application is authorized to use the resource. When it determines that the application is authorized, the OS 1101 then provides the resource to the application.

Examples of requests made by applications to the OS 1101 include a request for file reading/writing and a request for connection to other device connected by a network.

The content collecting application 1102 is an application for collecting photograph data recorded in the camera 1010 and/or the PC 1011 and storing the photograph data on the content storage apparatus 1001.

The content collecting application 1102 also monitors connection of a device such as the camera 1010 to the content storage apparatus 1001 through an universal serial bus (USB) or a wired/wireless LAN. Upon detecting a connection establishment, the content collecting application 1102 collects photograph data recorded in the device or a recording medium attached to the device.

The content collecting application 1102 also monitors network connection and collects photograph data recorded in a device when it detects that a device such as the PC 1011 is connected.

The content collecting application 1102 saves and stores collected photograph data onto a non-volatile storage device included in the content storage apparatus 1001.

The content sharing application 1103 shares photograph data stored on the content storage apparatus 1001 with the content display apparatus 1002 connected via a network.

In an exemplary case where photograph data is shared, the photograph data is acquired by the content display apparatus 1002.

The content storage apparatus 1001 shares photograph data by sending stored photograph data and/or a list of stored photograph data to the content display apparatus 1002 in response to a request from the content display apparatus 1002.

[Software Configuration of Content Display Apparatus 1002]

FIG. 3 shows the software configuration of the content display apparatus 1002 in Embodiment 1 of the present invention.

In FIG. 3, the content display apparatus 1002 includes an OS 1111 (FIG. 6), a viewer application 1112, a download control application 1113, a DL application A (a first application) 1114, and a DL application B (a second application) 1115.

Herein, "OS" denotes "operating system" and "DL application" means "downloaded application".

The OS 1111 loads applications to operate on the OS 1111 (such as viewer application 1112, download control application 1113, a DL application A 1114, a DL application B 1115) into memory and executes them.

When an application requests use of a resource managed by the OS 1111, the OS 1111 checks whether the requesting application is authorized to use the resource.

When it determines that the application is authorized, the OS 1111 then provides the resource to the application.

Requests made by applications to the OS 1111 include a request for file reading/writing and a request for connection to other device connected by a network.

The viewer application 1112 acquires photograph data (data 1001d in FIG. 1) from the content storage apparatus 1001 and displays the data in response to a request from the user of the content display apparatus 10002.

The viewer application 1112 also acquires a list of photograph data stored on the content storage apparatus 1001 from the content storage apparatus 1001 and displays the list.

The user selects photographs to display from the list of photograph data displayed.

When the user selects multiple pieces of photograph data from the displayed list of photograph data, the pieces of photograph data are displayed in a slideshow manner, that is, displayed in sequence at certain time intervals.

When the user orders exit of the application or disconnection from the content storage apparatus 1001, the viewer application 1112 deletes the displayed photograph data (data 1001d in FIG. 1).

The download control application 1113 communicates with the application distribution server 1020 (FIG. 1), which is connected with the content display apparatus 1002 over a network. The download control application 1113 then downloads an application (a program 1020p shown in FIG. 1) to the content display apparatus 1002 and installation of the application into the content display apparatus 1002.

The DL application A 1114 and the DL application B 1115 are each an application downloaded from the application distribution server 1020 (an application 1002a based on a downloaded program 1020p (FIG. 1)).

The DL application A 1114 and the DL application B 1115 have functions such as address management, web browsing, and electronic mail, and allow the user to use the functions.

[Hardware Configuration of Content Display Apparatus 1002]

FIG. 4 shows a hardware configuration of the content display apparatus 1002 in Embodiment 1 of the present invention (FIGS. 1 and 3).

In FIG. 4, the content display apparatus 1002 includes a system LSI 1200, a memory 1210, and a non-volatile storage device 1220.

The system LSI 1200 includes a Central Processing Unit (CPU) 1201, a network interface (I/F) 1202, and an input and output I/F 1203.

The CPU 1201 controls the operation of the entire content display apparatus 1002 by executing the OS 1111 stored in the memory 1210 and instruction codes contained in applications.

The CPU 1201 includes two modes: a privileged mode and a non-privileged mode.

The OS 1111 (see FIG. 3) operates in the privileged mode and has free access to various resources including the memory 1210, the network I/F 1202, and the input and output I/F 1203.

The viewer application 1112, the download control application 1113, the DL application A 1114, and the DL application B 1115 (see FIG. 3) each operate in the non-privileged mode and are allowed to only access resources within a range specified by the OS 1111.

The memory 1210 stores the OS 1111, the viewer application 1112, the download control application 1113, the DL application A 1114, and the DL application B 1115.

FIG. 4 shows the programs of the components of FIG. 3 loaded into the memory 1210.

The non-volatile storage device 1220 (FIG. 4) stores a protected-information access authorization list 1221 (see FIG. 7 described below).

The non-volatile storage device 1220 (not shown) also stores the programs of the components of FIG. 3 therein before they are loaded to the memory 1210. In other words, in a first state, a program is stored in the non-volatile storage device 1220. In a second state, the program is loaded onto the memory 1210 from the non-volatile storage device 1220. In a third state, the program is executed. Of the first to third states, the third state is present and the first state is also present before the third state. In other words, the program is stored beforehand in the non-volatile storage device 1220 from which the program is loaded.

The components shown in FIG. 3 correspond to the components stored in the memory 1210 shown in FIG. 4.

Their respective functions are realized by execution of software for implementing the components in the CPU 1201.

The content display apparatus 1002 further includes an input/output device not shown in FIG. 4, such as a liquid crystal display, connected to the content display apparatus 1002 via the input and output I/F 1203. No detailed descriptions are given as they are not essential part of the present invention.

The system LSI 1200 also includes a peripheral circuit and the like not shown in FIG. 4, but no detailed descriptions are given as they are not essential part of the present invention.

The memory 1210 may further have a work area for processing applications not shown in FIGS. 3 and 4 and/or photograph data.

Similarly, the non-volatile storage device 1220 may also store applications not shown in FIGS. 3 and 4 and/or content.

[Configuration of Application Distribution Server 1020]

FIG. 5 shows a configuration of the application distribution server 1020 in Embodiment 1 of the present invention (FIG. 1).

The application distribution server 1020 shown in FIG. 5 includes an application storage unit 2000, an application receiving unit 2001, and an application transmitting unit 2002.

The application storage unit 2000 stores applications managed by the application distribution server 1020 (a program 1020p in FIG. 1).

The application receiving unit 2001 communicates with a development device (not shown) on which applications are developed by application developers via a network and receives the applications uploaded by developers (program 1020p).

The application receiving unit 2001 also sends a received application to the application storage unit 2000 and requests the application storage unit 2000 to maintain and manage the application.

The application transmitting unit 2002 communicates with the content display apparatus 1002. As described earlier, the content display apparatus 1002 is connected to the application distribution server 1020 over a network. The application transmitting unit 2002 then acquires, from the application storage unit 2000, an application requested by the content display apparatus 1002 and acquired from the application distribution server 1020. The application transmitting unit 2002 then sends the acquired application to the requesting content display apparatus 1002.

The application transmitting unit 2002 also creates a list of applications stored in the application storage unit 2000 and sends the list to the content display apparatus 1002.

[Configuration of OS 1111]

FIG. 6 shows a configuration of the OS 1111 (see FIGS. 3 and 4) implemented on the content display apparatus 1002 in Embodiment 1 of the present invention.

In FIG. 6, the OS 1111 includes a protected-information access detecting unit 1501, a process managing unit 1502, an inter-process communication detecting unit 1503, and an access control unit 1504.

The protected-information access detecting unit 1501 checks whether a resource managed by the OS 1111 to which access is requested by an application is protected information (see data 1001d in FIG. 1) when an application makes an access request to the resource.

FIG. 7 shows a structure of the protected-information access authorization list 1221.

For example, the protected-information access authorization list 1221 shown in FIG. 7 may be stored as the protected-information access authorization list 1221 (FIG. 4) described above by the non-volatile storage device 1220 in a certain scenario.

The protected-information access detecting unit 1501 uses the protected-information access authorization list 1221 shown in FIG. 7 for checking whether target information is protected information.

In the protected-information access authorization list 1221, a protected information identifier (first data 1521*a*) for identifying protected information and an application identifier (second data 1521*b*) for which an operation is allowed during access to the protected information are stored in association with each other.

When there is an access request for a resource that agrees with the resource identified by the protected information identifier (first data 1521*a*) included in the protected-information access authorization list 1221 (the same resource), the protected-information access detecting unit 1501 (FIG. 6) performs processing for notifying the process managing unit 1502 of the application identifier (second data 1521*b*) associated with the protected information identifier (see a notification 1501*a* in FIG. 6).

Association between a resource and an application is done as follows: an application to be associated with the resource is the application that is identified by second data 1521*b* associated with first data 1521*a* that identifies the resource. Such association is made in the protected-information access authorization list 1221.

Hereinafter, an application that is thus associated with a resource by the protected-information access authorization list 1221 may be referred to simply as "the application corresponding to the resource".

When access to protected information (e.g., received data 1001*d* shown in FIG. 1) by an application (e.g., viewer application 1112 of FIG. 3) ends, the protected-information access detecting unit 1501 notifies the process managing unit 1502 of the completion of the access to the protected information (FIG. 6) (a notification 1501*a* in FIG. 6).

The protected-information access detecting unit 1501 also notifies the inter-process communication detecting unit 1503 of the start and end of access (FIG. 6) when access to protected information starts and ends (a notification 1501*c* and 1501*d* in FIG. 6). This is described in detail later.

Still referring to FIG. 6, the process managing unit 1502 manages applications operating on the OS 1111.

On the OS 1111, multiple applications can operate.

However, the content display apparatus 1002 includes only one CPU 1201, and thus can execute only a single application at a time.

The OS 1111 thus changes the application executed by the CPU 1201 at the timing of switching applications so as to allow multiple applications to perform their operations.

The "timing of switching applications" described above may be the timing when an application requests the OS 1111 to perform processing or the timing when there is an interrupt from hardware within the content display apparatus 1002.

The process managing unit 1502 includes a process list managing unit 1510, a process switching unit 1511, and an application execution control unit 1512.

The process list managing unit 1510 manages a list of processes operating on the OS 1111 (see the process list in FIGS. 8A to 8C described later).

Here, a process is an application operating on the OS 1111. When one application operates multiple times (such as when one application is operating in each one of multiple processes), they are managed as separate processes.

The process list managing unit 1510 uses the multiple process lists (process list 1522*x*) shown in FIGS. 8A, 8B, and 8C for process management.

Specifically, the process list managing unit 1510 uses a normal-time process list (a first process list) 1522, a protected-information access-time process list (a second process list) 1523, and an inter-process communication-time process list (a third process list) 1524.

The inter-process communication-time process list 1524 in FIG. 8C is described in greater detail later.

The process lists 1522, 1523 and 1524 each include application identifiers identifying applications and process identifiers for identifying applications (processes) that are actually in operation.

As shown in the figures, one process identifier is associated with one application identifier, for example.

It is also possible that one application is activated multiple times. In that case, there are multiple process identifiers associated with the same application identifier. More specifically, in such a case, a process list may include a first combination including an application identifier and a first process identifier associated with the application identifier as well as a second combination including the same application identifier as that application identifier and a second process identifier different from the first process identifier.

When a request to switch to a new process list is made by the application execution control unit 1512, the process list managing unit 1510 performs processing for saving the process list (e.g., first process list 1522 in FIG. 8A) that the process list managing unit 1510 currently manages, and switching to the new process list (e.g., a process list 1523 in FIG. 8B).

Furthermore, when there is a request to update the process list that the process list managing unit 1510 currently manages from the application execution control unit 1512, the process list managing unit 1510 updates the process list to the new process list.

Referring back to FIG. 6, the process switching unit 1511 switches the process to be executed by the CPU 1201 from one process to another process for each switching time.

Switching may be done in the order of processes included in a process list or in the order of priorities assigned to the individual processes.

More specifically, the switching may be processing adopting a known technique, such as one detailed in Chapter 7 of Non Patent Literature 1.

When the process managing unit 1502 receives an application identifier (see second data 1521*b* in FIG. 7) from the protected-information access detecting unit 1501 described above, the application execution control unit 1512 performs processing for limiting the operation of the application operating on the OS 1111.

Specifically, the application execution control unit 1512 acquires a process identifier as follows. There is an application identifier notified by the protected-information access detecting unit 1501, and there is the process identifier of a process associated with that application identifier in the process list currently managed as described above (the first process list 1522 of FIG. 8A). In the above-described acquisition, the application execution control unit 1512 acquires this process identifier from the process list managing unit 1510 (see FIG. 8A etc.).

The application execution control unit 1512 uses the process identifier acquired from the process list managing unit 1510 to create a process list 1523 (FIG. 8B). As described in detail later, the created process list 1523 of FIG. 8B does not include a combination that associates the notified application identifier with the process identifier, as a combination of an application identifier and a process identifier associated with that application identifier (see the columns of the tables in FIGS. 8B and 8A).

The application execution control unit 1512 requests the process list managing unit 1510 for replacing (changing) the process list 1522 (FIG. 8A) that is currently managed to the process list 1523 (FIG. 8B).

When the end of access to protected information is notified to the process managing unit 1502 by the protected-information access detecting unit 1501, the application execution control unit 1512 requests the process list managing unit 1510 to return the managed process list to the process list 1522 of FIG. 8A.

As describer in detail later, the following processing may be performed by the inter-process communication detecting unit 1503.

While a first application operating on the OS 1111 is accessing protected information, the inter-process communication detecting unit 1503 detects that the first application makes a request to the OS 1111 for inter-process communication between the first application and other second application in order to link with the second application. When the request is made, the inter-process communication detecting unit 1503 detects the request.

Upon detecting the inter-process communication request, the inter-process communication detecting unit 1503 notifies the detection of the request to both the process managing unit 1502 and the access control unit 1504. In the notification to the process managing unit 1502 and the access control unit 1504, the inter-process communication detecting unit 1503 notifies the process managing unit 1502 and the like of the application identifier of the second application which is the other party of communication.

Here, the inter-process communication detecting unit 1503 performs processing for handling the time interval from when it is notified of the start of access to protected information from the protected-information access detecting unit 1501 to when it is notified of the end of the access to the protected information as "period of protected-information access". In the "period of protected-information access", the inter-process communication detecting unit 1503 detects inter-process communication. When the end of the access to protected information is notified by the protected-information access detecting unit 1501, the inter-process communication detecting unit 1503 notifies the access control unit 1504 of the end of the access to the protected information.

The access control unit 1504 detects an operation that is for example network access or writing of a file by the process having the application identifier notified by the inter-process communication detecting unit 1503. Upon detecting the operation, the access control unit 1504 presents the information indicating the detection of the operation that is network access, file writing, or the like on a liquid crystal display of the content display apparatus 1002, and asks the user whether he or she permits the operation. When the user permits, the access control unit 1504 continues the operation. When the user does not permit, the access control unit 1504 sends information indicative of occurrence of an error back to the process.

[Accessing Protected Information]

The OS 1111 detects access to information designated as protected information, using the protected-information access detecting unit 1501 (FIG. 6).

Furthermore, while the detected access to the protected information continues, the OS 1111 allows only an application authorized to access the protected information to perform its operation. In other words, the OS 1111 switches the process list managed by the process managing unit 1502 so that only the authorized application can operate.

An application authorized to access the protected information as described above may be such an application indicated below in the following exemplary case. There is a protected information identifier (first data 1521a in FIG. 7) that determines (identifies) the protected information. For the protected information identifier, there is an associated application identifier (second data 1521b) in the protected-information access authorization list 1221 (FIG. 7). The application determined (identified) by the application identifier is the authorized application.

When access to protected information ends, the process list is switched to the previous list (e.g., the first process list 1522 of FIG. 8A) so that a return is made to the state before the access to the protected information started.

Thus, during the access to the protected information, applications that are not authorized to make such access, i.e., the applications other than the authorized application are caused to temporarily stop their operations. Consequently, during the access, only the authorized application can operate.

This prevents unauthorized applications from accessing the protected information during the access by the authorized application.

In addition, the unauthorized applications temporarily stop their operations while maintaining their states.

Thus, after the access to the protected information is completed, the unauthorized applications can restart their operations in the states maintained before and after the stoppage of their operations.

Here, the application identifier of the viewer application 1112 described in FIG. 3 (and FIG. 4) is assumed to be "application A" (see the second column of the second row in FIGS. 8A, 8B, and 7). The information indicative of the connection destination in accessing photograph data on the content storage apparatus 1001 is assumed to be "http://192.168.1.1/" (see the second column of the second row in FIG. 7).

FIG. 9 is a flowchart illustrating accessing of protected-information in Embodiment 1 of the present invention.

Processing performed when access to protected information is requested by the viewer application 1112 to the OS 1111 is described below with the flowchart of FIG. 9.

Here, assume that the protected information is photograph data stored on the content storage apparatus 1001 (data 1001d in FIG. 1). In addition, the processing for connecting to the content storage apparatus 1001 for the content display apparatus 1002 to share the photograph data with the content storage apparatus 1001 is referred to as "protected-information access".

In FIG. 9, of the left, center and right portions, the left portion shows processing performed by the content sharing application 1103 on the content storage apparatus 1001. The center and right portions show the processing performed by the content display apparatus 1002; the center portion shows the processing performed by the OS 1111 of the content display apparatus 1002, and the right portion shows the processing performed by the viewer application 1112. The processing performed by the OS 1111 shown in the center portion is conducted by one of the components included in the OS 1111, such as the protected-information access detecting unit 1501 of FIG. 6.

First, the viewer application 1112 of the content display apparatus 1002 (FIG. 3) makes a shared connection establishing request to the OS 1111 (FIG. 3) for sharing photograph data with the content storage apparatus 1001 (S1000).

The protected-information access detecting unit 1501 of the OS 1111 (FIG. 6) determines whether the shared connection establishing request at step S1000 described above is a request for accessing protected information (data 1001d in FIG. 1) (S1001).

Specifically, the information indicative of connection destination, described above contained in the shared connection establishing request is compared with the protected information identifier (first data 1521a) in the protected-information access authorization list 1221 of FIG. 7.

It is then checked whether there is a protected information identifier matching the connection-destination-indicative information described above among one or more protected information identifiers in the protected-information access authorization list 1221 of FIG. 7 (see the rows of FIG. 7).

When it is determined that there is a matching protected information identifier in the checking at step S1001 and that a current information requires protection ("Protection necessary" at S1001), the protected-information access detecting unit 1501 performs processing for notifying the application identifier to the application execution control unit 1512 of the process managing unit 1502. The application identifier notified is, for example, the application identifier (in the second column) associated with the protected information identifier (in the first column) which is determined to match in the protected-information access authorization list 1221 (FIG. 7). This notification may be part of the processing performed at S1002 described below, for example.

The application execution control unit 1512 performs the following processing. Specifically, after the above-described notification, a process identifier is acquired which is the process identifier of the process associated with the application identifier notified by the protected-information access detecting unit 1501. In the processing, the application execution control unit 1512 acquires that process identifier from the process list managing unit 1510 (see FIGS. 8A and 8B) and creates a process list 1523 (FIG. 8B) made up only of the acquired process identifier.

The application execution control unit 1512 requests the process list managing unit 1510 to switch the managed process list to the created process list 1523 (FIG. 8B).

The process list managing unit 1510 switches the process list upon receiving the request from the application execution control unit 1512. The switching is done by saving the currently active process list 1522 (FIG. 8A) and switching the managed (used) process list to the process list 1523 (FIG. 8B) requested by the application execution control unit 1512 (S1002).

When the protected-information access detecting unit 1501 determines that a current information does not require protection at step S1001 ("Protection unnecessary" at S1001) and after the processing at step S1002, the OS 1111 performs processing for making a shared connection establishing request to the content sharing application 1103 of the content storage apparatus 1001 (FIG. 2) (S1003).

The content sharing application 1103 of the content storage apparatus 1001 performs processing necessary for the shared connection requested by the shared connection establishing request (S1004).

Specifically, for example, this processing may be receiving authentication information such as a password from the content display apparatus 1002 when there is a shared connection establishing request (S1003) and checking whether the authentication information is the same as pre-registered authentication information.

After such processing for sharing connection establishing, the content sharing application 1103 notifies the content display apparatus 1002 of the result of the processing (S1005). At least part of the result notified here may indicate whether the processing for shared connection establishing is successful or not.

The OS 1111 of the content display apparatus 1002 notifies the viewer application 1112 of the result notified from the content sharing application 1103 (the result of the shared connection establishment) (S1006).

The viewer application 1112 thereafter communicates with the content sharing application 1103 via the OS 1111 and performs processing such as receiving and displaying photograph data (data 1001d in FIG. 1) through the communication at the user's request (S1007).

When the user requests that the sharing is ended, the viewer application 1112 deletes the photograph data shared with the content sharing application 1103 (data 1001d in FIG. 1) at step S1007. In this case, the viewer application 1112 then requests the OS 1111 to disconnect the shared connection (S1008).

Upon receiving the shared connection establishing request at step S1000 as described above, the protected-information access detecting unit 1501 of the OS 1111 checks whether a switch between the process lists is already made (S1009).

When it determines that the process list is switched When determining that the switch is made, at step S1009 ("Switched" at S1009), the protected-information access detecting unit 1501 notifies the end of the access to the protected information to the application execution control unit 1512 of the process managing unit 1502 (a notification 1501b in FIG. 6).

In response to the notification, the application execution control unit 1512 requests the process list managing unit 1510 to recover the process list 1522 (FIG. 8A).

Upon being requested to recover the process list by the application execution control unit 1512, the process list managing unit 1510 switches the current process list to the process list 1522 saved at step S1002 (FIG. 8A) (S1010).

When the protected-information access detecting unit 1501 determines "No" at step S1009 ("No" at step S1009) and after the processing at step S1010, the OS 1111 requests the content sharing application 1103 of the content storage apparatus 1001 to disconnect the shared connection (S1011).

In response to the shared connection disconnecting request, the content sharing application 1103 ends the sharing of photograph data.

In Embodiment 1 of the present invention, the viewer application 1112 (FIG. 3) makes a request for sharing photograph data to the content storage apparatus 1001 (FIG. 1). Here, the information indicative of connection destination is "http://192.168.1.1/".

The protected-information access authorization list 1221 is the one illustrated in FIG. 7 described above. Accordingly, the protected-information access authorization list 1221 includes a protected information identifier that matches the connection destination indicating information.

The protected-information access detecting unit 1501 thus determines that the current information requires protection at step S1001, and makes a notification as indicated below. As described above, the protected-information access authorization list 1221 includes the application identifier associated with the matching protected information identifier as an application identifier. The protected-information access detecting unit 1501 notifies the application execution control unit 1512 of the application A (see the foregoing description) determined (identified) by the application identifier. The above-description is given assuming that the earlier-described case where the protected-information access authorization list 1221 includes the matching protected information identifier.

The application execution control unit 1512 creates a process list 1523 (FIG. 8B) made up only of the process associated with the notified application (i.e., "application A"). The process list managing unit 1510 then switches the current process list to the process list 1523 (FIG. 8B) made up only of the process associated with that application (application A).

At step S1001, a determination is made as to whether current information to be accessed is protected information when there is a shared connection establishing request, the details are mere examples. Data to be accessed in the content storage apparatus 1001 may be other data that does not require protection, rather than data requiring protection (data 1001*d* in FIG. 1).

Thus, instead of making a determination when there is a shared connection establishing request (see S1001 in FIG. 9 etc.), a determination may be made as to whether current information to be accessed is at the time of actual data access, for example at step S1007.

This makes it possible to prevent unauthorized access to protected information even when a shared connection establishing request and access to protected information occur at different times.

At step S1008, the viewer application 1112 deletes photograph data shared with the content sharing application 1103, the details are mere examples. As another example, the data may be encrypted and saved in the non-volatile storage device 1220 instead of being deleted.

In this way, photograph data is made unavailable at S1008 by, for example, being deleted or encrypted.

[Application Linking]

For example, the inter-process communication detecting unit 1503 may be also provided as described above, and such processing as follows may be implemented.

The OS 1111 uses the inter-process communication detecting unit 1503 to detect that an application which accesses protected information requests inter-process communication between the application and another application in order to link with the other application.

Upon detecting that inter-process communication is to be made, the OS 1111 updates the current process list to a new process list (e.g., a process list 1524 in FIG. 8C) so that the other application, i.e., the communication-destination application can operate.

Here, the OS 1111 causes the access control unit 1504 to control the network access and/or file writing by an application which is the other party of the current communication.

After the inter-process communication ends, the OS 1111 updates the process list again so that the application as the other party of the communication stops its operation.

In this way, an unauthorized application (i.e., the other application) can link with an application which accesses protected information (i.e., the one application).

In addition, by implementing access control at the time of allowing an unauthorized application to perform its operation, leakage of photograph data is prevented even if an unauthorized application is in operation.

FIG. 10 is a flowchart illustrating application linking in Embodiment 1 of the present invention.

The processing performed when the viewer application 1112 requests application linking to the OS 1111 is described below with the flowchart of FIG. 10.

It is assumed here that protected information is photograph data (data 1001*d* in FIG. 1) stored on the content storage apparatus 1001, and that a notification target application is the DL application A 1114 (FIG. 3).

The viewer application 1112 first makes a request for application linking with the DL application A 1114 to the OS 1111 (S1100).

The inter-process communication detecting unit 1503 of the OS 1111 determines whether an application operating on the OS 1111 accesses protected information (S1101).

Specifically, the inter-process communication detecting unit 1503 determines that protected information is "currently being accessed" during an interval after a notification of the start of access to the protected information is received from the protected-information access detecting unit 1501 and before no notification of the end of the access to the protected information is received. It determines "No" when no notification of the start of any access to the protected information is received yet or a notification of the end of the access to the protected information is already received.

When the inter-process communication detecting unit 1503 determines that protected information is "currently being accessed" at step S1100, it notifies both the process managing unit 1502 and the access control unit 1504 of the application identifier of the application which is the other party of the communication established in response to the request for the inter-process communication.

The access control unit 1504 stores the application identifier received from the inter-process communication detecting unit 1503 and sets the identifier so that access control is implemented for it (S1102).

When the inter-process communication detecting unit 1503 determines "No" at step S1101 or after the processing at step S1102, the process managing unit 1502 of the OS 1111 activates the DL application A 1114 (the other application), i.e., the notification target application, and notifies the application link request to the application (S1103).

The process managing unit 1502 notifies the process identifier of the activated DL application A 1114 to the process list managing unit 1510 when activating the DL application A 1114, and requests the managing unit 1510 to add data for the DL application A 1114 to the process list.

The DL application A 1114 and the viewer application 1112 perform linking through communication therebetween (S1104).

When the DL application A 1114 requests, to the OS 1111, for network access or file writing during the linking, the access control unit 1504 performs the processes of determining that access by the DL application A 1114 should be controlled from the application identifier associated with the process identifier of the DL application A 1114, and implementing the access control.

When the linking ends, the DL application A 1114 sends an application link ending notification to the OS 1111 (S1105).

The inter-process communication detecting unit 1503 of the OS 1111 determines whether the application operating on the OS 1111 accesses any protected information (S1106).

This determination can be done, for example, in the same manner as step S1101 described above.

When determining that some protected information is "currently being accessed" at step S1106, the inter-process communication detecting unit 1503 notifies the end of application linking to both the process managing unit 1502 and the access control unit 1504.

The access control unit 1504 sets the application identifier received from the inter-process communication detecting unit 1503 so that no access control is implemented on it (S1107).

When the inter-process communication detecting unit 1503 determines "No" at step S1106 or after the processing at step S1107, the process managing unit 1502 of the OS 1111 terminates the DL application A 1114, which is the notification target, and notifies the viewer application 1112 of the end of the application linking (S1108).

As described above, according to Embodiment 1 of the present invention, only the process identifier of the process of the viewer application 1112 is included in the process list even at the timing of process switching by the process switching unit 1511. Consequently, applications other than the viewer application 1112 temporarily stop their operations. In this state, the applications other than the viewer application 1112 cannot be activated because their operations are stopped at the instant of attempting to start up even when such an attempt is made. Thus, even when an unauthorized application is in operation within the content display apparatus 1002 or the unauthorized application attempts to start up, the operation of the unauthorized application is temporarily stopped while the viewer application 1112 is displaying photograph data. This prevents an unauthorized application from accessing the photograph data displayed by the viewer application 1112 in an unauthorized manner.

Furthermore, even while the viewer application 1112 (i.e., the one application) is communicating with the content storage apparatus 1001 and accessing photograph data stored on the content storage apparatus 1001, another application operating in cooperation with the viewer application 1112 (i.e., the other application) can be activated.

By way of example, a DL application A 1114 (the other application) can be an application for editing photograph data. In this case, when the user wants to use the DL application A 1114 (the other application) to edit photograph data displayed by the viewer application 1112 (the one application), the user can launch the DL application A 1114.

In addition, access control is implemented on the application with which linking is requested (i.e., the other application) by the viewer application 1112.

This makes it possible to prevent unauthorized actions from occurring, such as sending photograph data displayed by the viewer application 1112 to the outside of the content display apparatus 1002 using a network, even when linking with an unauthorized application is requested.

This makes it possible to address the possibility of acquisition of a privileged user ID by an unauthorized downloaded application (e.g., application 1002w in FIG. 3) and access to a file saved by other application (e.g., viewer application 1112 in FIG. 3) as follows. Specifically, even if an unauthorized downloaded application acquires a privileged user ID and becomes able to access a file saved by other application in an unauthorized manner, unauthorized access to protected information that requires protection (e.g., personal information and personal content such as data 1001d in FIG. 1) is prevented.

For example, the following actions may be performed.

The information processing apparatus may be, for example, a content display apparatus (content display apparatus 1002 in FIG. 1) for displaying content such as photographs.

The content display apparatus may be, for example, an apparatus with the Android OS installed thereon as described above.

On the content display apparatus, the time when a predetermined period (during S1007 or during S1003 to S1011 in FIG. 9,) starts and the time when it ends may be identified to determine the period. For details, reference may be made to the foregoing description of the protected-information access detecting unit 1501, and S1000 and S1011 of FIG. 9.

The period determined is a period during which predetermined information (protected information, e.g., data 1001d of FIG. 1) is (can be) saved by the first application (e.g., the viewer application 1112 in FIG. 3).

As described above, the protected information may be, for example, personal information, such as the name of the user of a mobile phone, that can cause (relatively significant) undesirable result such as misuse thereof if it is known to a third party (see data 1001d in FIG. 1).

Data identifying the first application that saves protected information (viewer application 1112) among multiple applications may be then stored. For example, the data may be the protected-information access authorization list 1221 of FIG. 7, or the first data 1521b, which is an application identifier included in the protected-information access authorization list 1221 (see the description of the non-volatile storage device 1220 of FIG. 4 for example).

Control may be then implemented so as not to allow the second application (e.g., application 1002a in FIG. 3, a downloaded application described above) other than the identified first application during the determined period and allow the second application to be executed only in other time periods (S1002, S1010 in FIG. 9).

Here, the other second application is, for example an application that is downloaded, for example, from the application distribution server 1020 of FIG. 1 and executed on the content display apparatus.

For example, the other second application is the application 1002a (FIG. 3) downloaded (received) from the application distribution server 1020 of FIG. 1 over an open network such as the Internet.

The other second application (application 1002a) is, for example, an unauthorized application 1002w (FIG. 3) that is caused to be downloaded to and displayed on the content display device by a third party in an unauthorized manner in an exemplary scenario.

As described earlier, the unauthorized application 1002w is an application that can acquire a privileged user ID to become able to access a file saved by another application, such as the first application described above.

This makes it possible to address the possibility that the other second application (application 1002a) is an unauthorized application 1002w and the unauthorized application 1002w acquires the privileged user ID. Specifically, during the determined period in which the protected information is saved (during S1007), the second application (application 1002a) is not executed and thus the unauthorized application 1002w is not executed. This can prevent access to saved protected information (data 1001d) by the unauthorized application 1002w. This prevents unauthorized access to protected information from being made and can make access to be performed appropriate more reliably.

This makes it possible to avoid, for example, acquisition and knowledge of protected information by a third party who causes the unauthorized application 1002w to be executed, thereby avoiding (significant) undesirable result.

The above-described data (protected-information access authorization list 1221) may include second data 1521b (the application identifiers in FIG. 7) identifying the first application (viewer application 1112) that saves protected information and first data 1521a (a protected information identifier) that identifies saved protected information among pieces of information.

A determination may be then made as to whether the saved information (data 1001d) is the information (protected information) determined (identified) by the included first data 1521a (protected information identifier) (S1001 in FIG. 9).

Only when the information is determined to be the information identified by the second data ("Protection necessary" at S1001 in FIG. 9 and "Switched" at S1009), control for not allowing the execution of the second application (such as unauthorized application 1002w) may be implemented (such as S1002, S1010) as described above.

In other words, when the information is determined not to be the information identified by the second data (protected information) ("Protection unnecessary" at S1001 and "No" at S1009), such control is not implemented so that the second application (e.g., the DL application A 1114 in FIG. 3) is also allowed to be executed.

The process list 1522x (FIGS. 8A to 8C) may be utilized.

By the process list 1522x being utilized, at least one application (see the second row of the tables shown in FIGS. 8A to 8C) may be identified.

Then, only at least one application identified by the process list 1522x to be utilized in use among the applications included therein may be executed and the applications other than the at least one application may not be executed.

In the control for not allowing execution of the second application, the process list 1522x to be utilized may be changed from the first process list 1522 (FIG. 8A) to the second process list 1523 (FIG. 8B).

Here, for example, the first process list 1522 (FIG. 8A) may identify the remaining second applications (applications B to E in FIG. 8A) other than the first application (the viewer application 1112, application A in FIG. 8A) that saves protected information.

The other second process list 1523 (FIG. 8B) may then identify only the first application (the viewer application 1112, application A) without identifying the other second applications (the applications B to E).

By thus not allowing the other second applications to be executed during a period in which the second process list 1523 is the process list in use, the control for not allowing the execution of the second applications may be achieved (see the descriptions of S1002 and S1010 in FIG. 9 etc.).

Saved protected information may be stored, for example, by a content storage apparatus external to the content display apparatus (the content storage apparatus 1001). The stored protected information may be then acquired by the first application (viewer application 1112) and saved on the content display apparatus.

When such operations are preformed, they may be done as described specifically below in exemplary variations below.

Embodiment 2

In Embodiment 1 of the present invention, the application execution control unit 1512 requests the process list managing unit 1510 to switch process lists, thereby stopping the operations by applications not relevant to protected information.

Embodiment 2 shows a configuration in which the application execution control unit 1512 performs processing for terminating applications not relevant to protected information.

The configuration of the OS 1111 and access to protected information in Embodiment 2 of the present invention are described below.

In the description that follows, detailed descriptions of matters similar to Embodiment 1 may be omitted.

[Configuration of OS 1111]

Figure 11:
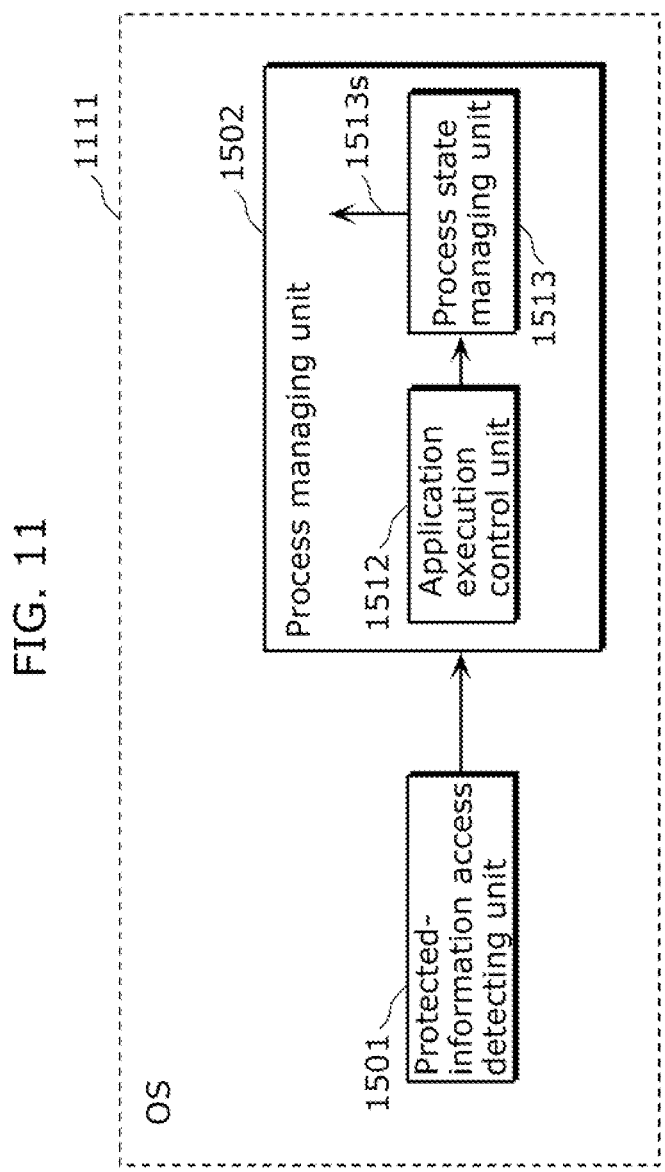
FIG. 11 shows the OS configuration of the content display apparatus in Embodiment 2 of the present invention.

FIG. 11 shows the configuration of the OS 1111 in Embodiment 2 of the present invention.

In FIG. 11, the same components as in FIG. 6 are denoted with the same reference numerals as FIG. 6 and their detailed description is omitted.

In FIG. 11, the OS 1111 includes a protected-information access detecting unit 1501 and a process managing unit 1502.

The protected-information access detecting unit 1501 performs operations similar to the operations performed in Embodiment 1 of the present invention.

The process managing unit 1502 includes an application execution control unit 1512 and a process state managing unit 1513.

The application execution control unit 1512 limits operations performed by some applications operating on the OS 1111 when the process managing unit 1502 receives an application identifier from the protected-information access detecting unit 1501.

Specifically, the application execution control unit 1512 requests the process state managing unit 1513 to save the state of the process associated with the application identifier notified by the protected-information access detecting unit 1501 (state-identifying information 1513s)

At this time, the application execution control unit 1512 notifies the process identifier of the process associated with the application identifier received from the protected-information access detecting unit 1501.

The process state managing unit 1513 temporarily saves the state of the process having the process identifier notified by the application execution control unit 1512 and terminates the process.

When the end of access to protected information is notified to the process managing unit 1502 by the protected-information access detecting unit 1501, the process state managing unit 1513 recovers the state of the process saved as described above and re-activates the terminated process.

[Accessing Protected Information]

Access to protected information in Embodiment 2 of the present invention is processing similar to the access to protected information in Embodiment 1 of the present invention (FIG. 9) in many respects. Thus, differences in processing are mainly described with reference to FIG. 9.

Referring to FIG. 9, the process managing unit 1502 of the OS 1111 in Embodiment 2 of the present invention determines whether the connection destination indicated in a shared connection establishing request made by the viewer application 1112 matches the protected information identifier in the protected-information access authorization list 1221 (S1001).

When the determination at step S1001 results in "Protection necessary", the application execution control unit 1512 requests the process state managing unit 1513 to save the process state and terminate the process.

In addition, when the OS 1111 is requested to disconnect shared connection by the viewer application 1112, it is determined at step S1009 in FIG. 9 whether the process state has been saved at step S1002, and when the process state is saved, the process state is recovered at step S1010 and the process is re-activated.

As described above, according to Embodiment 2 of the present invention, only the functions for saving and returning to the process state have to be added to typical process management functions; the modification has little effect on the existing process management functions.

Embodiment 3

In each of Embodiments 1 and 2 of the present invention, the OS 1111 includes the protected-information access detecting unit 1501, process managing unit 1502, inter-process communication detecting unit 1503, and access control unit 1504, and thereby causes applications not relevant to protected information to stop their operations.

Embodiment 3 utilizes virtualization technique and an environment in which multiple virtual machines operate on virtualization software. More specifically, in the configuration described below, virtualization software is used in place of the OS 1111 in each of Embodiments 1 and 2 and virtual machines are used in place of the viewer application 1112, the DL application A 1114, and the DL application B 1115 in the environment.

[Software Configuration of Content Display Apparatus 1002]

Figure 12:
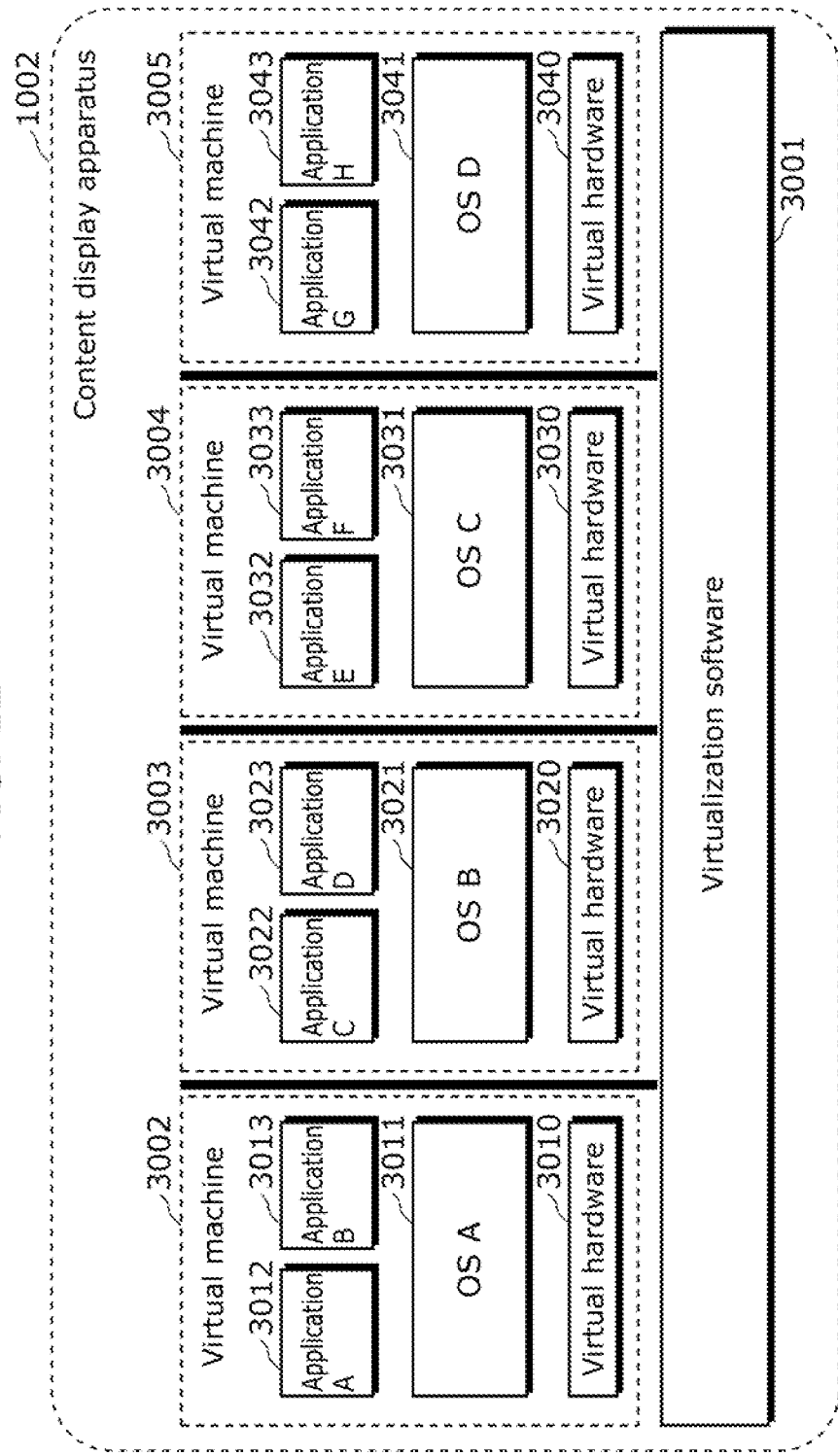
FIG. 12 shows the software configuration of the content display apparatus in Embodiment 3 of the present invention.

FIG. 12 shows the software configuration of the content display apparatus 1002 in Embodiment 3 of the present invention.

In FIG. 12, the content display apparatus 1002 includes virtualization software 3001 (FIG. 13) and virtual machines 3002, 3003, 3004, and 3005.

The virtualization software 3001 has (i) virtual machine management functions for managing the virtual machines 3002 to 3005 operating on the software, (ii) resource management functions for allocating hardware resources such as a memory to each of the virtual machines 3002 to 3005 and managing the hardware resources, and (iii) device access functions for accessing a device in response to a request from the virtual machines 3002 to 3005. The virtualization software 3001 is described in detail later.

The virtual machines 3002, 3003, 3004, 3005 each include virtual hardware (e.g., virtual hardware 3010), an OS (e.g., an OS A 3011), and one or more applications (applications 3012 and 3013). Each of the virtual machines is executed independently of the other virtual machines by the virtualization software 3001.

In Embodiment 3, the virtual machine 3002 includes virtual hardware 3010, an OS A 3011, an application A 3012, and an application B 3013.

The virtual machine 3003 includes virtual hardware 3020, an OS B 3021, an application C 3022, and an application D 3023.

The virtual machine 3004 includes virtual hardware 3030, an OS C 3031, an application E 3032, and an application F 3033.

The virtual machine 3005 includes virtual hardware 3040, an OS D 3041, an application G 3042, and an application H 3043.

The virtual hardware 3010, 3020, 3030, 3040 each virtually provide hardware functions to their respective virtual machines.

For example, the virtual hardware 3010, 3020, 3030, and 3040 each also include an Initial Program Loader (IPL) and a Basic Input/Output System (BIOS).

Each of the one or more of the virtual hardware 3010, 3020, 3030, and 3040 may be integrated with, for example, the virtualization software 3001 or the OS of a corresponding one of the virtual machines, depending on the configuration of the virtualization software 3001.

The OS A 3011, OS B 3021, OS C 3031, and OS D 3041 each load applications to operate on the OS onto their memories and execute them.

When there is a request from an application for utilizing a resource managed by the corresponding OS, the OS checks whether the application is authorized to utilize the resource, and provides the resource to the application depending on the check result.

Examples of requests that may be made by an application to each of the OSs include a request for file reading/writing and a request for connecting to other device connected by a network.

The application A 3012, the application B 3013, the application C 3022, the application D 3023, the application E 3032, the application F 3033, the application G 3042, and the application H 3043 have functions of address management, web browsing, electronic mailing, and the like, and provide the functions to the user(s) allows the users to use the functions.

These pieces of software are pre-stored in the non-volatile storage device 1220, expanded onto the memory 1210 when being executed, and executed by the CPU 1201.

Although exemplary and non-limiting Embodiment 3 of the present invention illustrates a case where four virtual machines operate on the virtualization software 3001, any plural number of virtual machines may operate.

In addition, although two applications operate in virtual machines in the illustrated case, the number of applications is a mere example, and one, or two or more applications, or different numbers of applications may be executed in the individual virtual machines.

Additionally, such applications may be applications downloaded from the application distribution server 1020, such as the DL application A 1114 and the DL application B 1115 described in Embodiment 1 of the present invention.

[Configuration of Virtualization Software 3001]

Figure 13:
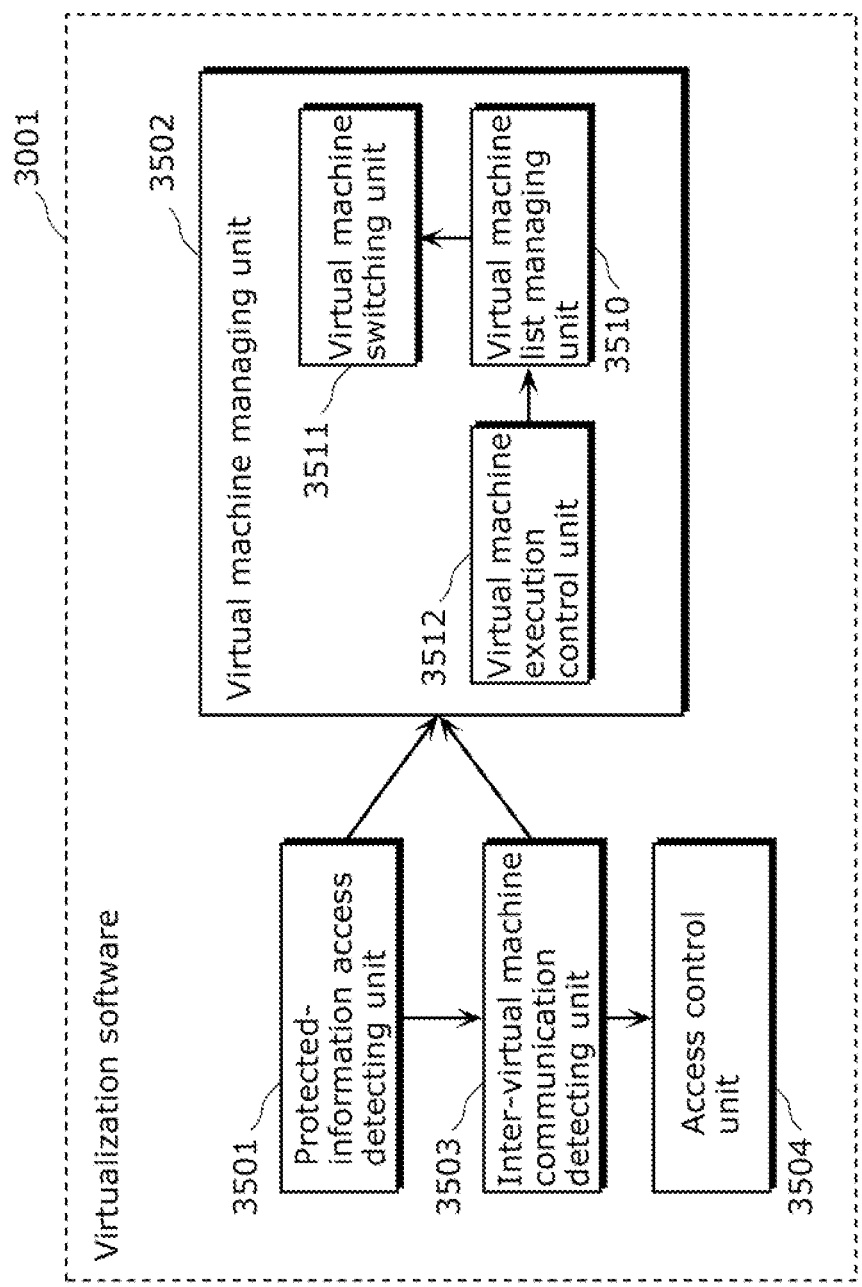
FIG. 13 shows the configuration of virtualization software in the content display apparatus in Embodiment 3 of the present invention.

FIG. 13 shows the configuration of the virtualization software 3001 (FIG. 12) in Embodiment 3 of the present invention.

In FIG. 13, the virtualization software 3001 includes a protected-information access detecting unit 3501, an inter-virtual machine communication detecting unit 3503, and an access control unit 3504.

The protected-information access detecting unit 3501 checks whether a resource to which access is requested by a virtual machine is protected information when there is an access request from a virtual machine for a resource managed by the virtualization software 3001.

Its basic operations are the same as the protected-information access detecting unit 1501 in Embodiment 1 of the present invention.

For example, the check is made in a manner similar to the manner performed by the protected-information access detecting unit 1501 in Embodiment 1 of the present invention.

In this embodiment, the protected-information access authorization list 1221 (see FIG. 7) includes a virtual machine identifier instead of an application identifier.

Upon detecting access to protected information, the protected-information access detecting unit 3501 notifies the virtual machine managing unit 3502 of a virtual machine identifier, and notifies the virtual machine managing unit 3502 of the end of access to protected information upon completion of the access to protected information.

The protected-information access detecting unit 3501 also notifies the inter-virtual machine communication detecting unit 3503 of the start and end of the access upon detecting the start and end.

The virtual machine managing unit 3502 manages virtual machines operating on the virtualization software 3001.

On the virtualization software 3001, multiple virtual machines can operate.

Since the content display apparatus 1002 includes only one CPU 1201, and thus can execute only a single virtual machine at a time.

Thus, the virtualization software 3001 allows multiple virtual machines to operate by switching the virtual machines being and to be executed by the CPU 1201 at the timing of switching.

For example, basic operations are the same as those performed by the process managing unit 1502 in Embodiment 1 of the present invention.

The virtual machine managing unit 3502 includes a virtual machine list managing unit 3510, a virtual machine switching unit 3511, and a virtual machine execution control unit 3512, as shown in FIG. 12.

The virtual machine list managing unit 3510 manages listing of virtual machines operating on the virtualization software 3001 in list form represented as a virtual machine list.

When it is requested to switch the virtual machine list that it currently manages to another one by the virtual machine execution control unit 3512, the virtual machine list managing unit 3510 saves the virtual machine list and switches to a new virtual machine list.

Furthermore, when there is a request to update the virtual machine list it currently manages from the virtual machine execution control unit 3512, the virtual machine list managing unit 3510 updates the virtual machine list to the new virtual machine list.

The virtual machine switching unit 3511 switches the virtual machine to be executed by the CPU 1201 from one virtual machine to another virtual machine at each timing of switching. The switching may be done, for example, in the same manner as the process switching by the process switching unit 1511 in Embodiment 1 of the present invention.

When the virtual machine managing unit 3502 receives a virtual machine identifier from the protected-information access detecting unit 3501, the virtual machine execution control unit 3512 limits the operation by the virtual machine operating on the virtualization software 3001.

Specifically, the virtual machine execution control unit 3512 creates a virtual machine list by using the virtual machine identifier notified by the protected-information access detecting unit 3501.

The virtual machine execution control unit 3512 requests the virtual machine list managing unit 3510 to replace the virtual machine list managed by the virtual machine list managing unit 3510 with the virtual machine list created by the virtual machine execution control unit 3512.

When the virtual machine managing unit 3502 receives the notification of the end of the access to the protected information from the protected-information access detecting unit 3501, the virtual machine execution control unit 3512 requests the virtual machine list managing unit 3510 to recover the virtual machine list.

When a virtual machine operating on the virtualization software 3001 makes a request for inter-virtual machine communication to the virtualization software 3001 in order to link with another virtual machine while accessing protected information, the inter-virtual machine communication detecting unit 3503 detects the request for inter-virtual machine communication and notifies the detection of the request to both the virtual machine managing unit 3502 and the access control unit 3504.

When making the notification to the virtual machine managing unit 3502 and the access control unit 3504, the inter-virtual machine communication detecting unit 3503 provides the virtual machine identifier of the other party of the communication.

The inter-virtual machine communication detecting unit 3503 detects, as a "period of protected-information access" inter-virtual machine communication regarding the time interval from when it is notified of the start of the access to the protected information from the protected-information access detecting unit 3501 to when it is notified of the end of the access to the protected information.

When the end of the access to the protected information is notified from the protected-information access detecting unit 3501, the inter-virtual machine communication detecting unit 3503 also notifies the access control unit 3504 of the end of the access to the protected information.

The access control unit 3504 detects an operation such as network access, writing to an HDD by the virtual machine having the virtual machine identifier notified by the inter-process communication detecting unit 1503.

Upon detecting it, the access control unit 3504 presents information indicating the detection of the operation on a liquid crystal display of the content display apparatus 1002, and asks the user whether to permit the operation that is network access, and HDD writing, or the like.

When the user permits, the access control unit 3504 continues the operation. When the user does not permit, the access control unit 3504 returns an error to the virtual machine.

The content display apparatus 1002 according to each of Embodiments 1 to 3 described above has functions for preventing unauthorized access to protected information but the functions may be disabled if the OS 1111 or the virtualization software 3001 is tampered with.

A mechanism called secure boot may be performed in startup upon power-up. The secure boot is intended to stop startup of an OS 1111, a virtualization software 3001, or the like if the one has been tampered.

Specific processes include to activate non-rewritable secured Read Only Memory (ROM) within the LSI first at the time of power-up, check the ROM for tampering of the Initial Program Loader (IPL), and load the IPL to the memory 1210 only when it is not tampered with, and pass control to the IPL.

The IPL checks if the OS 1111 and/or the virtualization software 3001 is tampered with, and only when they are not tampered with, performs processing for loading the OS 1111 and/or the virtualization software 3001 to the memory 1210 and passing control to the OS 1111 and/or the virtualization software 3001.

More specifically, the scheme defined by the Mobile Phone Work Group (MPWG) of the Trusted Computing Group (TCG) is available, for example.

The present invention is naturally not limited to Embodiments 1 to 3 described above. Such an exemplary case as described below is also encompassed in the present invention.

As described above, the processes other than the process performing detected access are stopped.

The information processing apparatus in each of the embodiments is however a tablet terminal, smartphone, or the like. More specifically, it is an Android terminal, for example. Accordingly, in many cases, an appropriate operation is achieved just by execution of one process corresponding to the topmost displayed window. Accordingly, in many cases, no undesirable effect (problem) occurs if the other processes are stopped.

This prevents unauthorized acquisition of protected information, and thereby prevents or reduces production of undesirable effects in many cases.

Protected information for which access is detected may be stored by a server (see the content storage apparatus 1001 in FIG. 1 etc.). In other words, the protected information needs to be stored in the information processing apparatus only when it is accessed, but does not need to be stored therein when it is not accessed. Thus, when there is no access, protected information may be difficult to be illegally acquired, and when there is access thereto, the protected information may be easy to be illegally acquired.

The process managing unit described earlier may also have a scheduler for multi-process operations and a scheduler for single-process operations, and one of the two schedulers to be used may be selected. Operations corresponding to the selected scheduler may then be performed.

The information processing apparatus may operate in a first mode for multi-processes when no access to protected information is detected and in a second mode for single-processes when access is detected.

A predefined identifier (e.g., application identifier 1521*b* in FIG. 7) for identifying a process may be stored. Such unauthorized acquisition of protected information may be prevented in a relatively reliable manner.

The application corresponding to the identified process may be an application pre-installed in the information processing apparatus at the time of manufacture or the like.

The application to be identified may be a signed application.

In addition, the application to be identified may be an application downloaded from a predetermined site (e.g., the Android Market site) or an application downloaded from a site (e.g., a so-called "katte" or unofficial sites) other than that site.

This also prevents a process performing a detected access from acquiring protected information in an unauthorized manner, and thus preventing unauthorized acquisition of protected information more reliably.

Besides, only processing involving use of a stored identifier is required, and thus processing to be performed can be relatively simple.

(1) Although protected information is photograph data in the above-described embodiments, the photograph data is an example.

Instead, the protected information may also be, for example, (i) personal information such as name, gender, address, and telephone number, (ii) content other than photographs such as movies and audio, (iii) confidential information such as secret information handled by a company, and (iv) data that should be protected within a device, such as device configuration information. In addition, which information should be protected information may be determined at the time of design or shipment and stored in the device before shipment, or may be specified by the user.

(2) In the above-described non-limiting embodiments, the content storage apparatus 1001 and the content display apparatus 1002 share photograph data and the content display apparatus 1002 stops operations by applications other than the viewer application 1112 when the photograph data is shared with the content storage apparatus 1001. However, it is to be noted that the details are mere examples.

Instead, the content storage apparatus 1001 may be connected with more than one content display apparatus 1002, and the content display apparatus 1002 may be connected with more than one content storage apparatus 1001.

In addition, the content storage apparatus 1001 may be any apparatus that stores some kind of data and the content display apparatus 1002 may be any apparatus that processes some kind of data.

The content storage apparatus 1001 may have functions of the content display apparatus 1002, and the content display apparatus 1002 may have functions of the content storage apparatus 1001.

In this case, operations by irrelevant applications may be stopped during operation sharing between multiple apparatuses, or operations of irrelevant applications may be stopped while protected information is processed independently on one apparatus.

(3) In the above-described embodiments, the OS 1111 includes the protected-information access detecting unit 1501, process managing unit 1502, inter-process communication detecting unit 1503, and access control unit 1504. However, it is to be noted that the details are mere examples.

Figure 14:
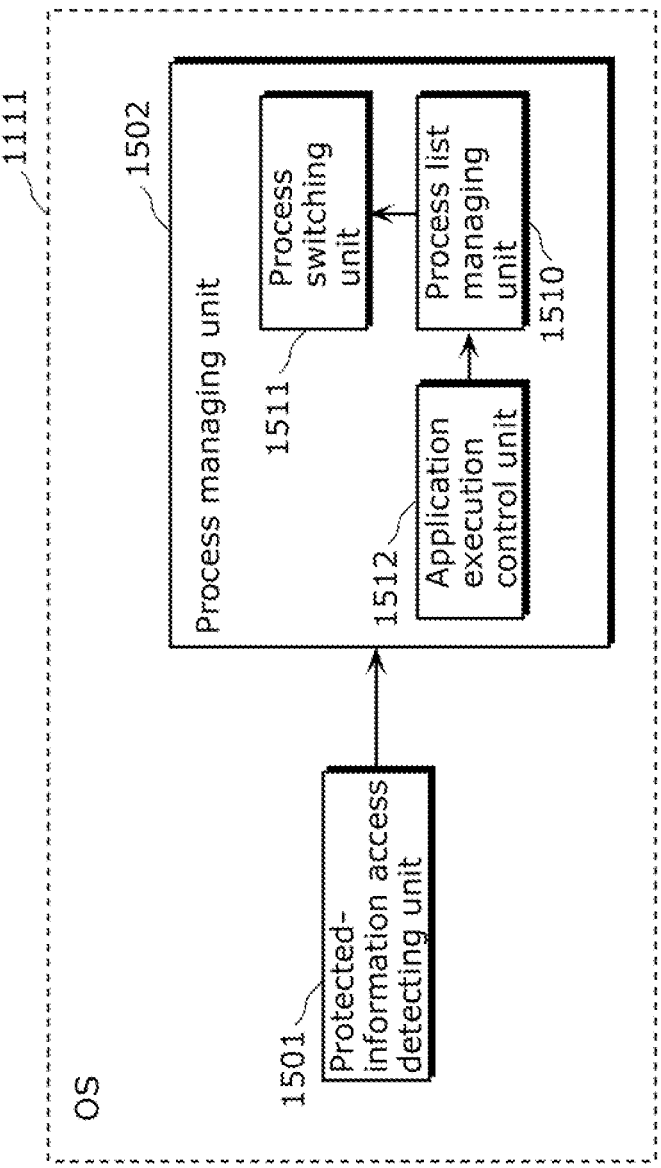
FIG. 14 shows the OS configuration of the content display apparatus in a variation of the present invention.

The OS 1111 may instead include, for example, the protected-information access detecting unit 1501 and the process managing unit 1502 as shown in FIG. 14. In this case, since linking with another application through inter-process communication cannot be performed during access to protected information, acquisition of protected information by an unauthorized application is completely prevented.

Figure 15:
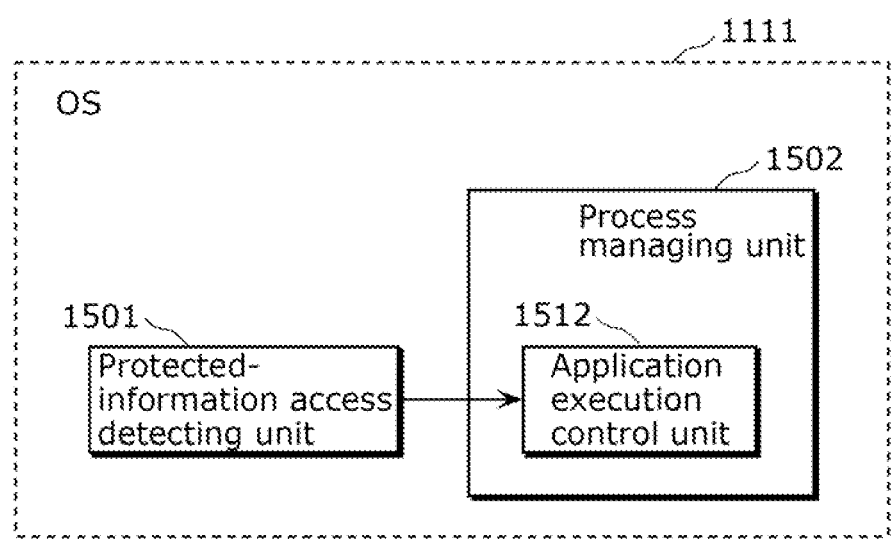
FIG. 15 shows the OS configuration of the content display apparatus in a variation of the present invention.

In addition, although the process managing unit 1502 includes the process list managing unit 1510, the process switching unit 1511, and the application execution control unit 1512 in the above exemplary and non-limiting embodiments, the process managing unit 1502 may include the application execution control unit 1512 as shown in FIG. 15, for example.

With the above-described configuration, it is possible to detect access to protected information and stop execution of an application that do not need to access protected information.

In this way, execution of an unauthorized application is stopped at the time of access to protected information. Thus, it is possible to prevent the unauthorized application from accessing the protected information.

(4) In the above-described embodiments, the protected-information access detecting unit 1501 detects access to protected information based on matching with the protected information identifier included in the protected-information access authorization list 1221 using the protected-information access authorization list 1221. However, it is to be noted that the details are mere examples.

In other words, for example, the protected-information access detecting unit 1501 may detect that protected information is being accessed when the content display apparatus 1002 is connected with other apparatus by a predetermined communication scheme (e.g., Bluetooth (a registered trademark), Wireless Fidelity (Wi-Fi, a registered trademark), or when the content display apparatus 1002 is connected with other apparatus over a Virtual Private Network (VPN).

In addition, the protected-information access detecting unit 1501 may detect that protected information is being accessed when data communication is made using such a connection, instead of when a connection is established.

In this way, it is possible to prevent unauthorized access to corporate confidential information by an application other than a dedicated application for accessing the corporation even when, for example, a user connects to a corporate server from a personal mobile device over a VPN and accesses the corporate confidential information.

Moreover, it may be detected that protected information is accessed when a particular application (e.g., a viewer application 1112) is activated.

The particular application may be a pre-designated application recorded in a non-volatile storage device, for example, at the time of shipment, an application having the description "involving access to protected information" included in a configuration file accompanying the application when the application is downloaded, or an application signed with a specific certificate.

Alternatively, it may be detected that protected information is being accessed when a flag for protected information indicates the access or there is access to a file or folder defined as protected information.

Furthermore, such a file or folder may be located on other terminal such as the content storage apparatus 1001 or located within the content display apparatus 1002.

(5) In the above-described embodiments the protected-information access authorization list 1221 is a list that stores a protected information identifier and an application identifier in association with each other. However, it is to be noted that the details are mere examples.

For example, in the protected-information access authorization list 1221, one protected information identifier may be associated with multiple application identifiers.

In addition, such an application identifier may be the application identifier of an application that is stopped during access to protected information, instead of the application identifier of an application that is executed during access to protected information.

In this case, the application execution control unit 1512 acquires, from the process list managing unit 1510, the process identifier of a process that is not associated with the application identifier notified by the protected-information access detecting unit 1501, and creates a new process list.

It is also possible to execute only an application that accessed protected information and stop the other applications, without involving association with an application identifier.

In this case, the protected-information access authorization list 1221 includes only the protected information identifier.

The protected-information access detecting unit 1501 notifies the process managing unit 1502 of the application identifier of an application that accessed protected information, instead of the application identifier associated with the protected information identifier.

(6) In the above-described embodiments, the protected-information access detecting unit 1501 determines whether protected information is currently being accessed. However, the protected-information access detecting unit 1501 may instead determine whether an application that accessed protected information is an application authorized to access protected information.

(7) In the above-described embodiments, the CPU 1201 is capable of executing only one application at a time. However, the number of applications is a mere example.

For example, the CPU 1201 may be such a multi-core CPU that includes multiple execution units (cores) in a single CPU, and thus can execute applications equal to or fewer than the number of the included cores concurrently. Alternatively, the CPU 1201 may include multiple CPUs and be able to execute applications equal to or fewer than the number of the CPUs concurrently.

In this case, the process managing unit 1502 switches the applications to operate on the cores or CPUs either at the same time or timings different among the respective cores or CPUs.

(8) In the above-described embodiments, the process lists 1522, 1523, and 1524 each include an application identifier and a process identifier, but the details are mere examples. These lists may include an application identifier, a process identifier, and an executability flag.

For a process that is authorized to execute processing, the executability flag is set to "executable", and for a process that is not authorized to execute processing, the flag is set to "non-executable". In this case, instead of providing a new process list to the process list managing unit 1510, the application execution control unit 1512 may notify the process list managing unit 1510 of the application identifier or the process identifier of a process whose operation is stopped, and may then set the executability flag corresponding to the notified application or process identifier to "non-executable". Reversely, the application execution control unit 1512 may notify the process list managing unit 1510 of the application identifier or the process identifier of a process whose operation is continued, and may then set the executability flags for the applications/processes other than the notified application identifier or process identifier to "non-executable".

(9) In the above-described embodiments, when an application operating on the OS 1111 requests the OS 1111 to make inter-process communication while accessing protected information in order to link with another application, the inter-process communication detecting unit 1503 detects the request and notifies the detection of the inter-process communication request to both the process managing unit 1502 and the access control unit 1504. However, it is to be noted that the details are mere examples.

It may instead determine whether the request is permitted and notify the detection of the inter-process communication request only when the request is permitted.

The method of determining whether a request is permitted may be based on the type of notified data or the notification target application.

Examples of determination methods based on data type include a method of prohibiting notification for access to photograph data and a method of permitting notification for access to photograph data and prohibiting notification for access to personal information.

Examples of determination methods based on notification target applications include various methods such as a method of permitting notification to an application pre-installed at shipment, a method of determining whether to permit notification to an application depending on the signer of a sign included in the application, and a method of determining whether to permit notification to an application depending on the types of resources to which the notification-destination application make access.

(10) In the above-described embodiments, the access control unit 1504 detects an operation that is for example network access or writing of a file by a process having the application identifier notified by the inter-process communication detecting unit 1503, and asks the user whether to permit the operation that is the network access, file writing, or the like. However, it is to be noted that the details are mere examples.

In other words, any access may be prohibited, or depending on an access type, network access may be prohibited and file writing may be permitted.

How to perform processing after access detection may be specified at the time of shipment, may be configurable by a user by providing the user with a setting menu, or varied according to the type of data communicated in inter-process communication. Instead of asking the user, a query may be sent to a predetermined server.

(11) In the above-described embodiments, the application execution control unit 1512 uses the process identifier acquired from the process list managing unit 1510 to create a process list 1523. However, it is to be noted that the details are mere examples.

In other words, the process list 1523 may also include the process identifiers of other processes, in addition to the process identifier of the process that requested access to protected information acquired from the process list managing unit 1510.

For example, an application that needs to operate continuously, such as a music player, may be included in the process list 1523, so that the application can operate during access to protected information.

An application specified by the user may be allowed to operate continuously. An application of a certain kind, for example, a music player, may be allowed to operate continuously. Alternatively, whether or not to allow an application to operate continuously may be determined depending on a sing added to the application.

Furthermore, a process allowed to operate other than the process that requested access to protected information may be subjected to access control by the access control unit 1504 during the access to the protected information.

In this case, the application execution control unit 1512 notifies the access control unit 1504 of the process identifier of the process allowed to operate continuously.

(12) Each of the aforementioned apparatuses is, specifically, a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operations according to the computer program. Here, the computer program is configured by combining plural instruction codes indicating instructions for the computer with an aim to achieve their functions.

(13) A part or all of the structural elements of the respective apparatuses may be configured with a single system-LSI (Large-Scale Integration). The system-LSI is a super-multi-function LSI manufactured by integrating structural units on a single chip, and is specifically a computer system configured to include a microprocessor, a ROM, a RAM, and so on. A computer program is stored in the RAM. The system-LSI achieves its function through the microprocessor's operations according to the computer program.

Furthermore, each unit of the structural units of the respective apparatuses may be made as separate individual chips, or as a single chip to include a part or all thereof.

The name used here is system LSI, but it may also be called IC, system LSI, super LSI, or ultra LSI depending on the degree of integration. Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

Furthermore, if integrated circuit technology that replaces LSI appears thorough progress in semiconductor technology or other derived technology, that technology can naturally be used to carry out integration of the constituent elements. Biotechnology is anticipated to apply.

(14) A part or all of the constituent elements constituting the respective apparatuses may be configured as an IC card which can be attached to and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its functions through the microprocessor's operations according to the computer program. The IC card or the module may also be implemented to be tamper-resistant.

(15) The present invention may be implemented as the above-described methods, and as computer programs for executing the above-described method, using a computer, and may also be implemented as digital signals including the computer programs.

Furthermore, the present invention may also be implemented as computer programs or digital signals recorded on computer-readable recording media such as a flexible disc, a hard disk, a CD-ROM, an MO, a DVD, a DVD-ROM, a DVD-RAM, a BD (Blu-ray Disc, a registered trademark), and a semiconductor memory.

Furthermore, the present invention may also be implemented as the aforementioned computer programs or digital signals transmitted via a telecommunication line, a wireless or wired communication line, a network represented by the Internet, a data broadcast, and so on.

The present invention may also be implemented as a computer system including a microprocessor and a memory, in which the memory stores the aforementioned computer program and the microprocessor operates according to the computer program.

Furthermore, it is also possible to execute another independent computer system by transmitting the programs or the digital signals recorded on the aforementioned recording media, or by transmitting the programs or digital signals via the aforementioned network and the like.

(16) the above-described embodiments and the variations thereof may be arbitrarily combined.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image decoding apparatus according to each of the embodiments is a program described below.

The program causes a computer to execute an information processing method of processing protected information. For example, the method is performed by an information processing apparatus and includes: managing a process which operates in the information processing apparatus; and detecting access to the protected information, wherein the managing includes temporarily stopping the operation of each of at least one process other than a process which accesses the protected information when the access to the protected information is detected in the detecting.

INDUSTRIAL APPLICABILITY

The information processing apparatus according to the invention is applicable as an information processing apparatus which includes an application execution control unit that allows operation by only an application authorized to access protected information, and is capable of preventing unauthorized applications from accessing the protected information by temporarily stopping the operation by the unauthorized applications during the authorized access to the protected information even if the unauthorized applications are operating.

REFERENCE SIGNS LIST

1000 Content storage and display system
1001 Content storage apparatus
1002 Content display apparatus
1002p Process 1010 Camera
1011 PC
1020 Application distribution server
1101, 1111 OS
1102 Content collecting application
1103 Content sharing application
1112 Viewer application
1113 Download control application
1114 DL application A
1115 DL application B
1200 System LSI
1201 CPU
1202 Network I/F
1203 Input and output I/F
1210 Memory
1220 Non-volatile storage device
1221 Protected-information access authorization list
1501, 3501 Protected-information access detecting unit
1502 Process managing unit
1503 Inter-process communication detecting unit
1504, 3504 Access control unit
1510 Process list managing unit
1511 Process switching unit
1512 Application execution control unit
1513 Process state managing unit
1522 Normal-time process list
1523 Protected-information access-time process list
1524 Inter-process communication-time process list
2000 Application storage unit
2001 Application receiving unit
2002 Application transmitting unit
3001 Virtualization software
3002, 3003, 3004, 3005 Virtual machine
3010, 3020, 3030, 3040 Virtual hardware
3011 OS A
3012 Application A
3013 Application B
30210 OS B
3022 Application C
3023 Application D
3031 OS C
3032 Application E
3033 Application F
3041 OS D
3042 Application G
3043 Application H
3502 Virtual machine managing unit
3503 Inter-virtual machine communication detecting unit
3510 Virtual machine list managing unit
3511 Virtual machine switching unit
3512 Virtual machine execution control unit

The invention claimed is:

1. An information processing apparatus which processes protected information, the apparatus comprising:
a non-transitory memory storing executable instructions; and
a processor which executes the executable instructions stored by the non-transitory memory, the processor including:
a process managing unit configured to manage a plurality of processes which operate in the information processing apparatus; and
an access detecting unit configured to detect access to the protected information,
wherein the process managing unit includes an execution control unit configured to temporarily stop the operation of each of at least one process other than a process which accesses the protected information among the plurality of processes when the access to the protected information is detected by the access detecting unit, and
the process which accesses the protected information communicates with a process which is a communication destination originally for the at least one process other than the process which accesses the protected information while the operation of the at least one process is stopped,
the processor further including
a communication detecting unit configured to detect the communication, and notify the execution control unit of a process identifier for identifying the communication-destination process upon detecting the communication,
wherein the execution control unit is configured to cause the communication-destination process identified by the notified process identifier to stop operating only before the process identifier is notified, and cause the process to operate after the process identifier is notified.

2. The information processing apparatus according to claim 1,
wherein the processor further includes
a process list managing unit configured to manage a process list which is a list of the plurality of processes managed by the process managing unit, and
wherein the execution control unit is further configured to temporarily stop the operation of each of the at least one process other than the process which accesses the protected information by causing the process list managing unit to replace the managed process list with a process list which includes only the process which accesses the protected information when the access to the protected information is detected by the access detecting unit.

3. The information processing apparatus according to claim 1,
wherein the processor further includes
an access control unit configured to limit access by a process to a resource, and
wherein the communication detecting unit is configured to notify the access control unit of the process identifier for identifying the communication-destination process upon detecting the communication, so that the access control unit limits the access by the communication-destination process to the resource.

4. The information processing apparatus according to claim 1,
wherein the application execution control unit is further configured to temporarily stop the operation of the at least one process by causing the process list managing unit to replace the managed process list with a process list which does not include any of the at least one process when the access to the protected information is detected by the access detecting unit.

5. The information processing apparatus according to claim 1, further comprising
a non-volatile storage device,
wherein the execution control unit is further configured, when the access to the protected information is detected, (i) to save a state of each of the at least one process to the non-volatile storage device and stop the operation of each of the processes when the detected access is started, and (ii) to control so that each of the processes returns to the state saved to the non-volatile storage device and re-starts the operation of the at least one process when the detected access is ended.

6. The information processing apparatus according to claim 1,
wherein the process managing unit is configured to manage at least one first process and a second process which operates at a background, and
the execution control unit is configured to cause the at least one first process to stop as the at least one process when the access is detected, and cause the second process to operate together with the process which accesses even when the access is detected.

7. The information processing apparatus according to claim 1,
wherein the execution control unit is configured to cause the information processing apparatus to perform a multiple-process operation when no access is detected and to perform a single-process operation when the access is detected.

8. An information processing method of processing protected information, the method being performed by an information processing apparatus and comprising:
managing a process which operates in the information processing apparatus; and
detecting access to the protected information,
wherein the managing includes temporarily stopping the operation of each of at least one process other than a process which accesses the protected information when the access to the protected information is detected in the detecting, and
the process which accesses the protected information communicates with a process which is a communication destination originally for the at least one process other than the process which accesses the protected information while the operation of the at least one process is stopped,
the information processing method further comprising
detecting the communication, and notifying, for the temporarily stopping, a process identifier for identifying the communication-destination process upon detecting the communication,
wherein the temporarily stopping includes causing the communication-destination process identified by the notified process identifier to stop operating only before the process identifier is notified, and causing the process to operate after the process identifier is notified.

9. A non-transitory computer-readable recording medium having a program recorded thereon, the program causing a computer to execute an information processing method of processing protected information, the method being performed by an information processing apparatus and comprising:
managing a process which operates in the information processing apparatus; and
detecting access to the protected information,
wherein the managing includes temporarily stopping the operation of each of at least one process other than a process which accesses the protected information when the access to the protected information is detected in the detecting, and
the process which accesses the protected information communicates with a process which is a communication destination originally for the at least one process other than the process which accesses the protected information while the operation of the at least one process is stopped,
the information processing method further comprising
detecting the communication, and notifying, for the temporarily stopping, a process identifier for identifying the communication-destination process upon detecting the communication,
wherein the temporarily stopping includes causing the communication-destination process identified by the notified process identifier to stop operating only before the process identifier is notified, and causing the process to operate after the process identifier is notified.

10. An integrated circuit which is at least a part of an information processing apparatus which processes protected information, the integrated circuit comprising:
a process managing unit configured to manage a plurality of processes which operate in the information processing apparatus; and
an access detecting unit configured to detect access to the protected information,
wherein the process managing unit includes an execution control unit configured to temporarily stop the operation of each of at least one process other than a process which accesses the protected information among the plurality of processes when the access to the protected information is detected by the access detecting unit, and
the process which accesses the protected information communicates with a process which is a communication destination originally for the at least one process other than the process which accesses the protected information while the operation of the at least one process is stopped,
the integrated circuit further comprising
a communication detecting unit configured to detect the communication, and notify the execution control unit of a process identifier for identifying the communication-destination process upon detecting the communication,
wherein the execution control unit is configured to cause the communication-destination process identified by the notified process identifier to stop operating only before the process identifier is notified, and cause the process to operate after the process identifier is notified.

* * * * *